United States Patent [19]
Ueda et al.

[11] Patent Number: 5,600,489
[45] Date of Patent: Feb. 4, 1997

[54] COPYING ZOOM LENS SYSTEM

[75] Inventors: Toshihiko Ueda; Hiroki Kinoshita, both of Toyokawa, Japan

[73] Assignee: Minolta Co., Ltd., Osaka, Japan

[21] Appl. No.: 357,450

[22] Filed: Dec. 16, 1994

[30] Foreign Application Priority Data

Dec. 21, 1993 [JP] Japan .................................. 5-322555

[51] Int. Cl.$^6$ ................................................ G02B 15/14
[52] U.S. Cl. ........................................ 359/679; 359/689
[58] Field of Search .................................. 359/686, 679, 359/689

[56] References Cited

U.S. PATENT DOCUMENTS

| | | | |
|---|---|---|---|
| 4,198,127 | 4/1980 | Itoh | 359/689 |
| 4,509,833 | 4/1985 | Ikemori | 359/689 |
| 4,787,718 | 11/1988 | Cho | 359/686 |
| 4,813,773 | 3/1989 | Minefuji | 359/679 |
| 4,955,700 | 9/1990 | Yamaguchi | 359/689 |
| 5,270,864 | 12/1993 | Watanabe | 359/679 |
| 5,315,441 | 5/1994 | Hori et al. | 359/686 |
| 5,345,338 | 9/1994 | Ueda et al. | 359/679 |
| 5,461,512 | 10/1995 | Ruben | 359/689 |

FOREIGN PATENT DOCUMENTS 1123210  5/1989  Japan .

*Primary Examiner*—Scott J. Sugarman
*Attorney, Agent, or Firm*—Price, Gess & Ubell

[57] ABSTRACT

A copying zoom lens system is provided with from the original side a first lens unit of negative refractive power including at least one negative lens element, a second lens unit of positive refractive power including at least four lens elements, and a third lens unit of negative refractive power including at least one negative lens element. The second lens unit is asymmetric with respect to the center of the lens units of the lens system. During zooming, the projection magnification is varied with the conjugate distance being maintained constant by varying the distance between the first and second lens units and the distance between the second and third lens units and by moving the entire lens system. The axial distances among the lens units are defined by predetermined conditions.

30 Claims, 18 Drawing Sheets

I II III

I II III

I II III

I  II  III

I  II  III

I  II  III

I II III

I II III

I II III

I II III

I II III

2X

1X 0.5X

FNo/6.0
d
g
c
sc
-2.0  2.0
SPHERICAL SINE
ABERRATION CONDITION

W=19.7°
DS d
DT d
-2.0  2.0
ASTIGMATISM

W=19.7°
-0.5 0.0 0.5 %
DISTORTION

FNo/5.4
d
g
c
sc
-2.0  2.0
SPHERICAL SINE
ABERRATION CONDITION

W=19.8°
DS d
DT d
-2.0  2.0
ASTIGMATISM

W=19.8°
-0.5 0.0 0.5 %
DISTORTION

FNo/6.0
d
g
c
sc
-2.0  2.0
SPHERICAL SINE
ABERRATION CONDITION

W=19.8°
DS d
DT d
-2.0  2.0
ASTIGMATISM

W=19.8°
-0.5 0.0 0.5 %
DISTORTION

FNo/7

-2.0  2.0
SPHERICAL SINE
ABERRATION CONDITION

W=19.7°

-2.0  2.0
ASTIGMATISM

W=19.7°

-0.5 0.0 0.5%
DISTORTION

FNo/6.4

-2.0  2.0
SPHERICAL SINE
ABERRATION CONDITION

W=19.8°

-2.0  2.0
ASTIGMATISM

W=19.8°

-0.5 0.0 0.5%
DISTORTION

FNo/6.4

-2.0  2.0
SPHERICAL SINE
ABERRATION CONDITION

W=19.8°

-2.0  2.0
ASTIGMATISM

W=19.8°

-0.5 0.0 0.5%
DISTORTION

FNo/7

-2.0 2.0
SPHERICAL SINE
ABERRATION CONDITION

W=19.7°

-2.0 2.0
ASTIGMATISM

W=19.7°

-0.5 0.0 0.5%
DISTORTION

FNo/6.4

-2.0 2.0
SPHERICAL SINE
ABERRATION CONDITION

W=19.8°

-2.0 2.0
ASTIGMATISM

W=19.8°

-0.5 0.0 0.5%
DISTORTION

FNo/6.4

-2.0 2.0
SPHERICAL SINE
ABERRATION CONDITION

W=19.8°

-2.0 2.0
ASTIGMATISM

W=19.8°

-0.5 0.0 0.5%
DISTORTION

FIG.19A
FNo/7
FIG.19B
W=19.7°
FIG.19C
W=19.7°
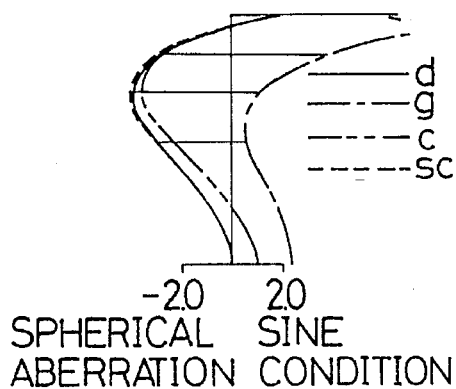
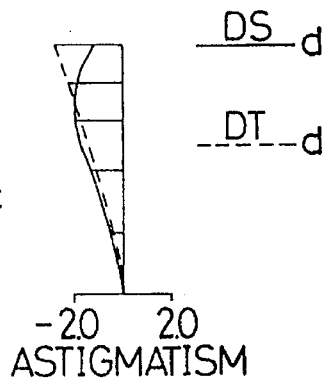
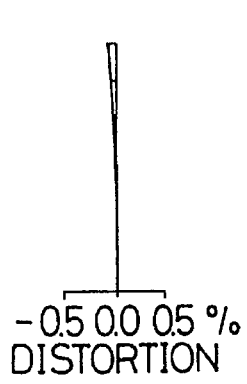
-2.0  2.0
SPHERICAL  SINE
ABERRATION CONDITION
-2.0  2.0
ASTIGMATISM
-0.5 0.0 0.5 %
DISTORTION
FIG.19D
FNo/6.4
FIG.19E
W=19.8°
FIG.19F
W=19.8°
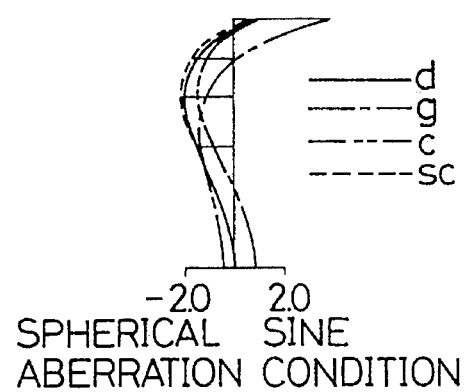
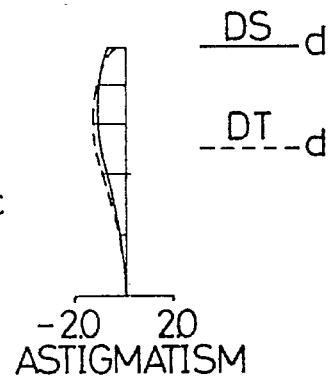
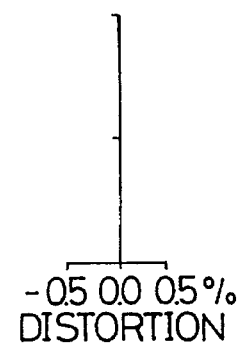
-2.0  2.0
SPHERICAL  SINE
ABERRATION CONDITION
-2.0  2.0
ASTIGMATISM
-0.5 0.0 0.5 %
DISTORTION
FIG.19G
FNo/6.4
FIG.19H
W=19.8°
FIG.19I
W=19.8°
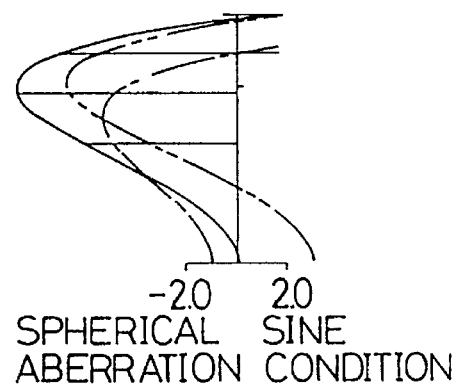
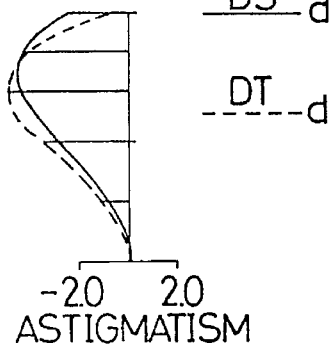
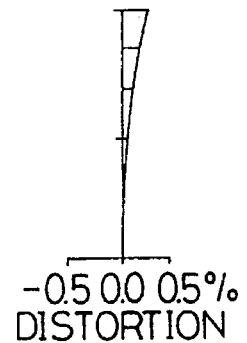
-2.0  2.0
SPHERICAL  SINE
ABERRATION CONDITION
-2.0  2.0
ASTIGMATISM
-0.5 0.0 0.5 %
DISTORTION

FIG.20A
FNo/5.9
FIG.20B
W=19.7°
FIG.20C
W=19.7°
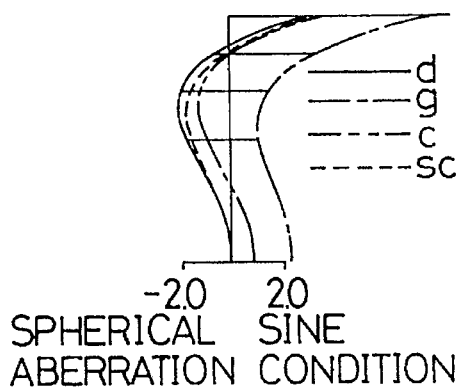
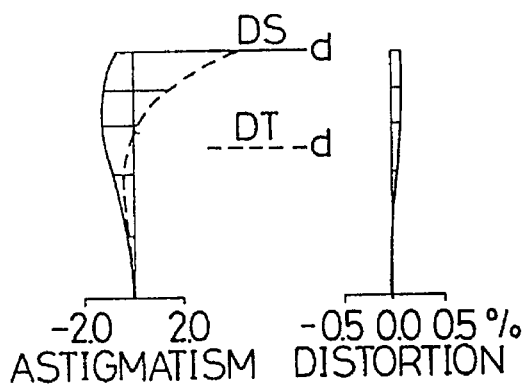
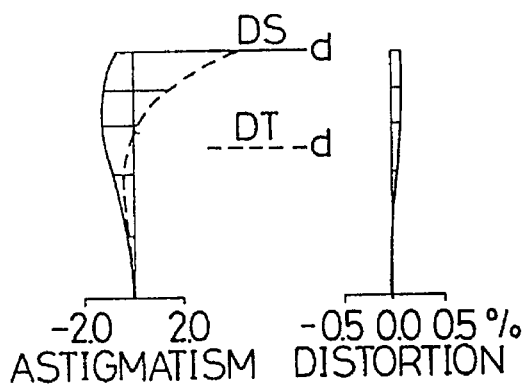
-2.0  2.0
SPHERICAL SINE
ABERRATION CONDITION
-2.0  2.0
ASTIGMATISM
-0.5 0.0 0.5%
DISTORTION
FIG.20D
FNo/5.4
FIG.20E
W=19.8°
FIG.20F
W=19.8°
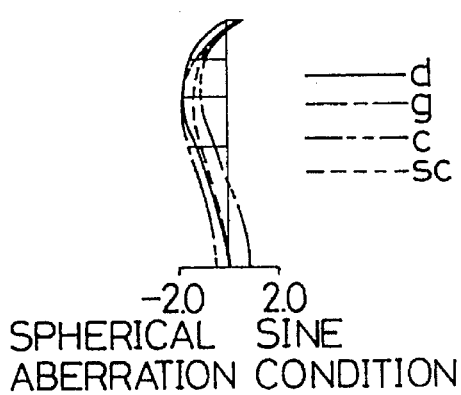
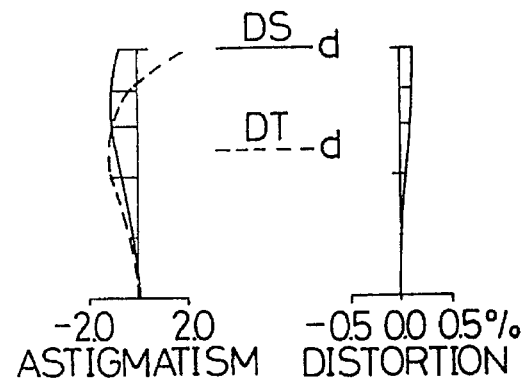
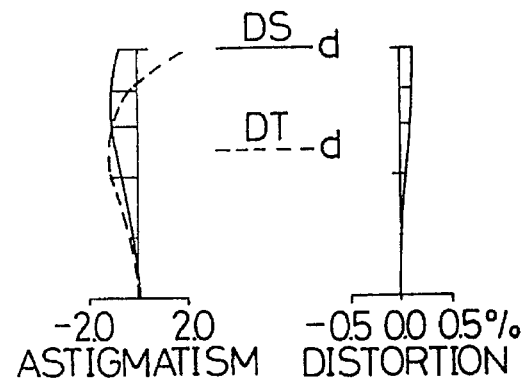
-2.0  2.0
SPHERICAL SINE
ABERRATION CONDITION
-2.0  2.0
ASTIGMATISM
-0.5 0.0 0.5%
DISTORTION
FIG.20G
FNo/5.4
FIG.20H
W=19.8°
FIG.20I
W=19.8°
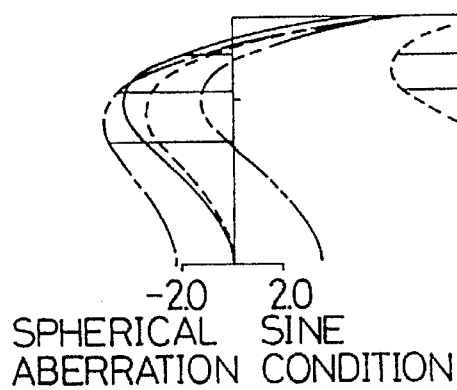
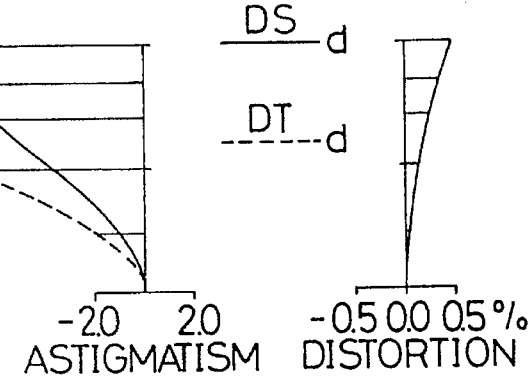
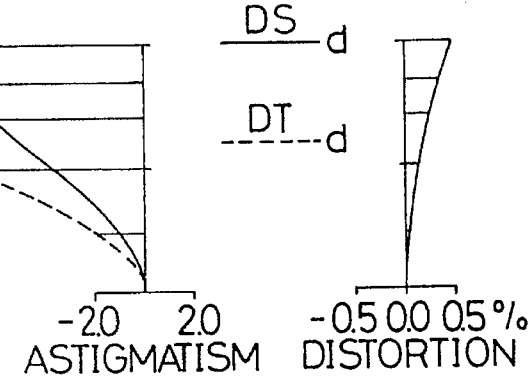
-2.0  2.0
SPHERICAL SINE
ABERRATION CONDITION
-2.0  2.0
ASTIGMATISM
-0.5 0.0 0.5%
DISTORTION FNo/7.1
SPHERICAL ABERRATION
SINE CONDITION

W=19.7°
ASTIGMATISM

W=19.7°
DISTORTION

FNo/6.4
SPHERICAL ABERRATION
SINE CONDITION

W=19.8°
ASTIGMATISM

W=19.8°
DISTORTION

FNo/6.4
SPHERICAL ABERRATION
SINE CONDITION

W=19.8°
ASTIGMATISM

W=19.8°
DISTORTION

FNo/7.0
SPHERICAL SINE
ABERRATION CONDITION

W=19.7°
ASTIGMATISM

W=19.7°
DISTORTION

FNo/6.4
SPHERICAL SINE
ABERRATION CONDITION

W=19.8°
ASTIGMATISM

W=19.8°
DISTORTION

FNo/6.4
SPHERICAL SINE
ABERRATION CONDITION

W=19.8°
ASTIGMATISM

W=19.8°
DISTORTION

FNo/7.0

-2.0   2.0
SPHERICAL   SINE
ABERRATION CONDITION

W=19.7°

-2.0   2.0
ASTIGMATISM

W=19.7°

-0.5 0.0 0.5%
DISTORTION

FNo/6.4

-2.0   2.0
SPHERICAL   SINE
ABERRATION CONDITION

W=19.8°

-2.0   2.0
ASTIGMATISM

W=19.8°

-0.5 0.0 0.5%
DISTORTION

FNo/6.4

-5.0   5.0
SPHERICAL   SINE
ABERRATION CONDITION

W=19.8°

-5.0   5.0
ASTIGMATISM

W=19.8°

-0.5 0.0 0.5%
DISTORTION

F 5.9
SPHERICAL ABERRATION

— d
--- g
-5.0  5.0

W=19.8°
ASTIGMATISM

DS —— d
DT --- d
-5.0  5.0

DISTORTION

-1.0 0.0 1.0 %

F 6.4
SPHERICAL ABERRATION

— d
--- g
-5.0  5.0

W=19.7°
ASTIGMATISM

DS —— d
DT --- d
-5.0  5.0

DISTORTION

-1.0 0.0 1.0 %

F 5.9
SPHERICAL ABERRATION

— d
--- g
-5.0  5.0

W=19.8°
ASTIGMATISM

DS —— d
DT --- d
-5.0  5.0

DISTORTION

-1.0 0.0 1.0 %

FIG.25A
F 5.9
— d
--- g
-5.0  5.0
SPHERICAL ABERRATION
FIG.25B
W=19.8
—— DS d
--- DT d
-5.0  5.0
ASTIGMATISM
FIG.25C
-1.0 0.0 1.0 %
DISTORTION
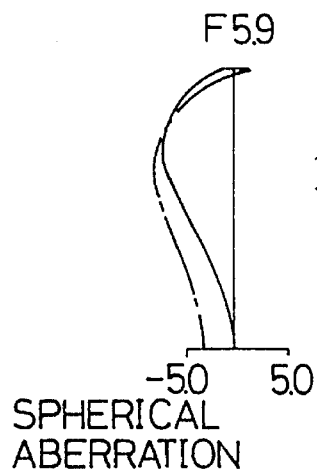
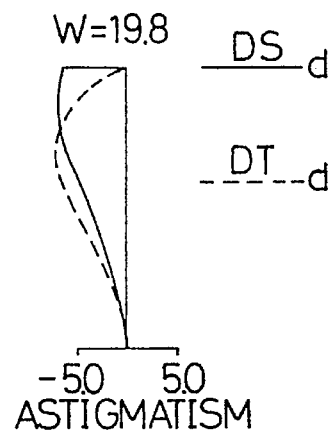
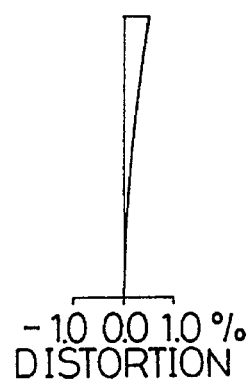
FIG.25D
F 6.4
— d
--- g
-5.0  5.0
SPHERICAL ABERRATION
FIG.25E
W=19.7°
—— DS d
--- DT d
-5.0  5.0
ASTIGMATISM
FIG.25F
-1.0 0.0 1.0 %
DISTORTION
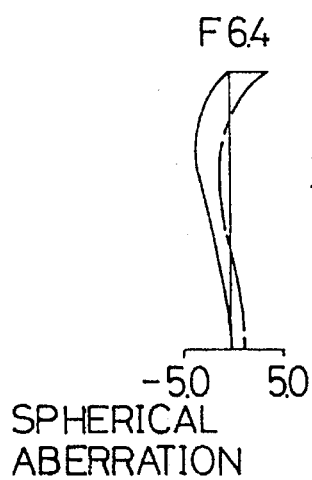
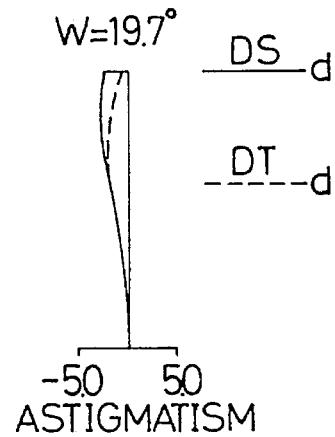
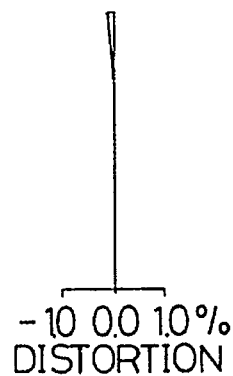
FIG.25G
F 5.9
— d
--- g
-5.0  5.0
SPHERICAL ABERRATION
FIG.25H
W=19.8°
—— DS d
--- DT d
-5.0  5.0
ASTIGMATISM
FIG.25I
-1.0 0.0 1.0 %
DISTORTION
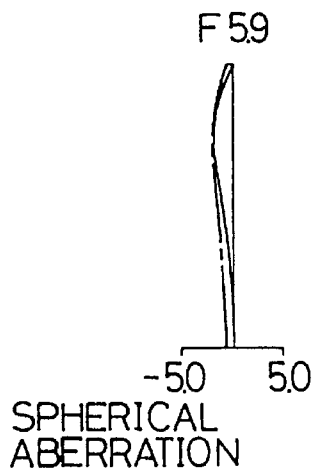
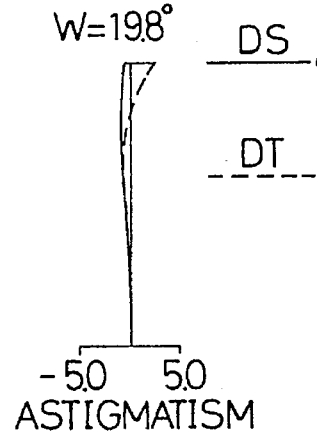
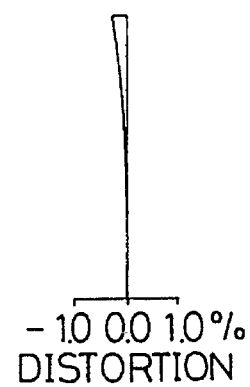

F 5.9

SPHERICAL ABERRATION

W=19.8°

ASTIGMATISM

DISTORTION

F 6.4

SPHERICAL ABERRATION

W=19.7°

ASTIGMATISM

DISTORTION

F 5.9

SPHERICAL ABERRATION

W=19.8°

ASTIGMATISM

DISTORTION

COPYING ZOOM LENS SYSTEM

BACKGROUND OF THE INVENTION

1. Field of the Invention

The present invention relates to a copying zoom lens system where zooming is performed at a constant conjugate distance, and more particularly, to a three-unit copying zoom lens system of negative, positive, negative configuration.

2. Description of the Prior Art

Conventionally, various types of varifocal lens systems where the conjugate distance is constant, the entire lens system is moved for zooming and the focal length is varied by varying the axial distances have been proposed as copying zoom lens systems.

For example, zoom lens systems comprising from the original side a negative first lens unit, a positive second lens unit and a negative third lens unit and where zooming is performed by varying the distance between the first and second lens units and the distance between the second and third lens units are disclosed in U.S. Pat. Nos. 4,813,773 and 5,270,864, and Japanese Laid-open Patent Application H1-123210.

In the zoom lens systems disclosed by U.S. Pat. No. 4,813,773, the refractive power arrangement of the second lens unit is substantially symmetric, and during zooming, the distance between the first and second lens units and the distance between the second and third lens units are substantially symmetrically varied, so that the refractive power arrangement of the entire lens system is basically symmetric during zooming. In the zoom lens systems disclosed by U.S. Pat. No. 5,270,864 and Japanese Laid-open Patent Application No. H1-123210, the distance between the first and second lens units and the distance between the second and third lens units are asymmetrically varied during zooming so that the refractive power arrangement of the entire lens system is asymmetric during zooming.

However, in the case of the prior art lens systems where the distance between the first and second lens units and the distance between the second and third lens units are substantially symmetrically varied, the refractive power arrangement of the entire lens system is symmetric during zooming, so that the generation amount of lateral chromatic aberration and coma increases although the variation in distortion is small during zooming. The generation of these aberrations are remarkable particularly when the magnification range is increased to 0.5× to 2.0× and the F-number is decreased.

In the case of the prior art lens systems where the distance between the first and second lens units and the distance between the second and third lens units are asymmetrically varied, the variation in distortion increases although the generation amount of coma decreases during zooming. The generation of these aberrations are remarkable particularly when the magnification range is increased to 0.5× to 2.0× and the F-number is decreased.

Thus, conventional three-unit zoom lens systems of negative, positive, negative configuration have both merits and demerits. Particularly, when the magnification range is large, aberrations are not excellently corrected in the entire range.

SUMMARY OF THE INVENTION

An object of the present invention is to provide a copying zoom lens system where the correction of aberrations such as distortion, coma and lateral chromatic aberration is excellently made in a wide magnification range from 0.5× to 2.0× in a three-unit copying zoom lens system of negative, positive, negative configuration where the conjugate distance is constant, the entire lens system is moved for zooming and the focal length is varied by varying the axial distances.

BRIEF DESCRIPTION OF THE DRAWINGS

This and other objects and features of this invention will become clear from the following description, taken in conjunction with the preferred embodiments with reference to the accompanied drawings in which:

FIGS. 19A to 19C show aberration curves of the fourth embodiment at a magnification of 1.0×;

FIGS. 19D to 19F show aberration curves of the fourth embodiment at a magnification of 0.5×;

FIGS. 19G to 19I show aberration curves of the fourth embodiment at a magnification of 2.0×;

FIGS. 20A to 20C show aberration curves of the fifth embodiment at a magnification of 1.0×;

FIGS. 20D to 20F show aberration curves of the fifth embodiment at a magnification of 0.5×;

FIGS. 20G to 20I show aberration curves of the fifth embodiment at a magnification of 2.0×;

FIGS. 25A to 25C show aberration curves of the tenth embodiment at a magnification of 1.0×;

FIGS. 25D to 25F show aberration curves of the tenth embodiment at a magnification of 0.5×;

FIGS. 25G to 25I show aberration curves of the tenth embodiment at a magnification of 2.0×;

DESCRIPTION OF THE PREFERRED EMBODIMENTS

Hereinafter, embodiments of the present invention will be described.

Figure 1:
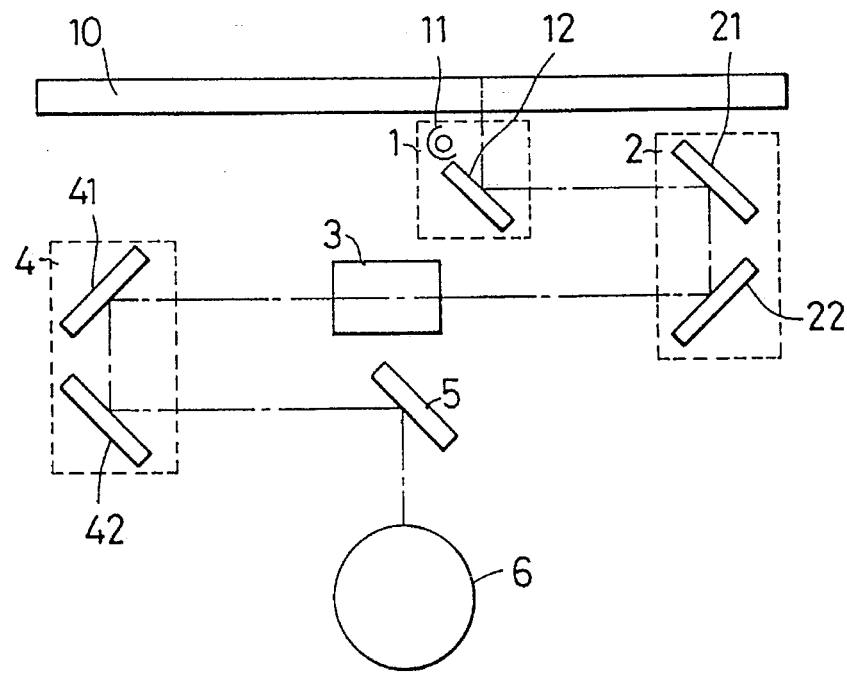
FIG. 1 schematically shows an optical system of a copying machine employing a copying optical system of the present invention.

Referring to FIG. 1, there is shown an optical system of a copying machine employing a copying zoom lens system of the present invention. The image of an original placed on an original stand glass 10 is scanned by a first slider 1 constituted by a lighting system 11 and a first mirror 12, and a second slider 2 constituted by a second mirror 21 and a third mirror 22. The scanned image is zoomed by a zoom lens system 3, and is projected and formed into an image on a photoreceptor 6 through a fourth mirror 41, a fifth mirror 42 and a sixth mirror 5. In this optical system, the conjugate distance is constant, and zooming is performed by varying the focal length of the lens by moving the entire zoom lens system 3 and the axial distances thereof.

Hereinafter, first to eleventh embodiments will be described.

As shown in FIGS. 3 to 6 and 11 to 13, the first to fourth and ninth to eleventh embodiment comprise from the original side a negative first lens unit including at least one lens element, a positive second lens unit including at least four lens elements and a negative third lens unit including at least one lens element. The positive second lens unit is asymmetric with respect to its center. During zooming, by varying the distance between the negative first lens unit and the positive second lens unit and the distance between the positive second lens unit and the negative third lens unit and by moving the entire lens system, the projection magnification is varied with the conjugate distance being maintained constant. By providing the positive second lens unit with at least four lens elements, the correction of aberrations other than distortion such as spherical aberration and field curvature is facilitated even when the F-number is small and the magnification range is large, and by asymmetrically arranging the refractive power of the positive second lens unit, coma is excellently corrected. The first to fourth and ninth to eleventh embodiments fulfill the following conditions (1) and (2):

$$0.3 < \frac{d12E}{d12R} < 1.5 \quad (1)$$

$$0.5 < \frac{d23E}{d23R} < 3.0 \quad (2)$$

where d12E is a distance between the negative first lens unit and the positive second lens unit at the enlargement end, d12R is a distance between the negative first lens unit and the positive second lens unit at the reduction end, d23E is a distance between the positive second lens unit and the negative third lens unit at the enlargement end, and d23R is a distance between the positive second lens unit and the negative third lens unit at the reduction end.

The conditions (1) and (2) are conditions for restraining the variation in distortion. When the upper and lower limits are exceeded, the variation in distortion increases in a large magnification range from 0.5× to 2.0×. For example, like the first embodiment, when the first and third lens units are moved asymmetrically with respect to the second lens unit like a lens moving manner in which the distance between the first and second lens units is decreased and the distance between the second and third lens units is increased during enlargement and the distance between the first and second lens units is increased and the distance between the second and third lens units is decreased during reduction (see, for example, FIG. 14), the variation in distortion increases if the refractive power arrangement of the entire lens system is strongly asymmetric during zooming, so that it is necessary to restrain the variation in distortion. This variation is remarkable when the magnification range is large. The condition (1) defines the asymmetry of the refractive power arrangement of the entire lens system so as not to be too strong to restrain the variation in distortion during zooming.

Moreover, for example, like the second to fourth and ninth to eleventh embodiments, when the first and third lens units are moved substantially symmetrically with respect to the second lens unit (the distance between the first and second lens units is increased during enlargement and the distance between the first and second lens units is decreased at unity magnification) and the lens units are moved so that the distance between the first and second lens units is substantially the same at a magnification m and at a magnification 1/m and that the distance between the second and third lens units is substantially the same at a magnification m and at a magnification 1/m (see, for example, FIG. 15), although the variation in distortion during zooming is restrained, the generation of aberrations other than distortion, particularly the generation of coma increases, so that it is necessary to restrain it. The generation of the aberration is remarkable when the magnification range is large. In this case, the aberration correction is particularly difficult if the refractive power arrangement of the second lens unit is symmetric with respect to the center of the second lens unit.

In the first to fourth and ninth to eleventh embodiments, to excellently correct aberrations such as coma, the refractive power of the positive second lens unit is asymmetrically arranged and the positive second lens unit is provided with four lens elements. Thus, since the refractive power arrangements of the first to fourth and ninth to eleventh embodiments are not extremely asymmetric during zooming, the variation in distortion is not increased and the power arrangement is not completely symmetric, and since the positive second lens unit is provided with four lens elements, the generation of aberrations such as coma is not increased.

The asymmetric refractive power arrangement of the positive second lens unit will further be described.

In the first, second, and ninth to eleventh embodiments, the positive second lens unit includes from the original side a positive first lens element, a positive second lens element, a negative lens element strongly concave to the image side and a positive third lens element so that the refractive power arrangement of the positive second lens unit is asymmetric. Thereby, aberrations are excellently corrected even when the F-number is comparatively small, e.g. 5.6 to 6.5.

In the first and second embodiments, the positive second lens unit includes from the original side two positive meniscus lens elements convex to the original side, a negative meniscus lens element concave to the image side and a bi-convex lens element.

In the ninth to eleventh embodiments, the positive second lens unit includes from the original side two positive meniscus lens elements convex to the original side, a bi-concave lens element and a bi-convex lens element.

In the third embodiment, the positive second lens unit includes from the original side a bi-convex lens element, a bi-concave lens element, a positive meniscus lens element concave to the original side and a bi-convex lens element so that the refractive power arrangement of the positive second lens unit is asymmetric. Thereby, coma and field curvature are excellently corrected even at a comparatively wide angle of view.

In the fourth embodiment, the positive second lens unit includes from the original side a bi-convex lens element, a bi-concave lens element, a negative meniscus lens element concave to the original side and a bi-convex lens element so that the refractive power arrangement of the positive second lens unit is asymmetric. Thereby, coma and field curvature are excellently corrected even at a comparatively wide angle of view.

The fifth to eighth embodiments include, as shown in FIGS. 7 to 10, from the original side a negative first lens unit including at least one negative lens element, a positive second lens unit including at least three lens elements and a negative third lens unit including at least one negative lens element. The positive second lens unit is asymmetric with respect to its center. At least one aspherical surface is provided in the entire lens system. During zooming, by varying the distance between the negative first lens unit and the positive second lens unit and the distance between the positive second lens unit and the negative third lens unit and by moving the entire lens system, the projection magnification is varied with the conjugate distance being maintained constant.

By providing at least one aspherical surface in the entire lens system, aberrations are excellently corrected even when the F-number is small and the magnification range is large. In addition, by arranging the refractive power of the positive second lens unit asymmetrically, the correction of coma is enabled. Further, the fifth to eighth embodiments fulfill the above-mentioned conditions (1) and (2).

The conditions (1) and (2) are conditions for restraining the variation in distortion as mentioned above. When its upper and lower limits are exceeded, the variation in distortion increases at the enlargement and reduction ends in a large magnification range from 0.5× to 2.0×. For example, like the sixth embodiment, when the first and third lens units are moved asymmetrically with respect to the second lens unit like a lens moving manner in which the distance between the first and second lens units is decreased and the distance between the second and third lens units is increased during enlargement and the distance between the first and second lens units is increased and the distance between the second and third lens units is decreased during reduction (see, for example, FIG. 14), the variation in distortion increases if the refractive power arrangement of the entire lens system is strongly asymmetric during zooming, so that it is necessary to restrain the variation in distortion. This variation is remarkable when the magnification range is large. The condition (1) defines the asymmetry of the refractive power arrangement of the entire lens system so as not to be too strong to restrain the variation in distortion during zooming.

Figure 15:
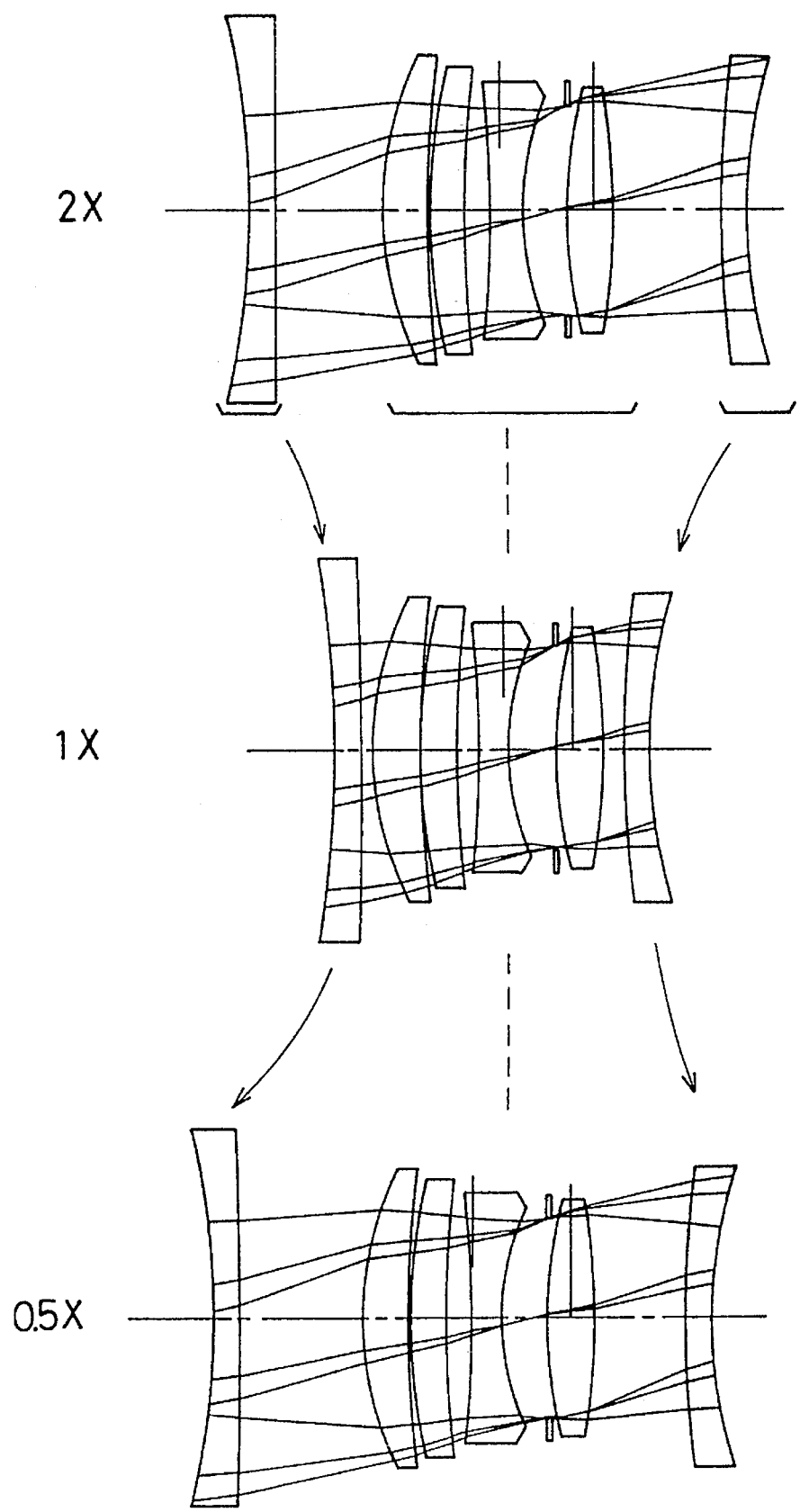
FIG. 15 shows a symmetric movement of the lens units of the zoom lens of the present invention during zooming.
Figure 16A:
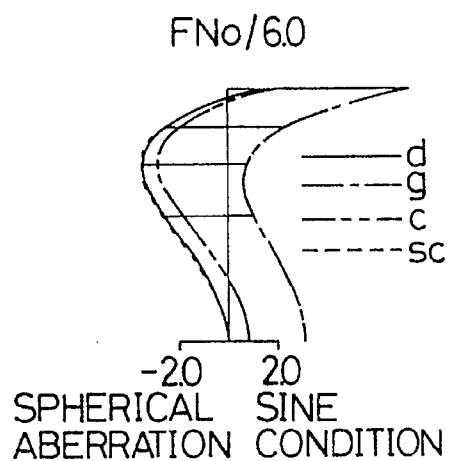
FIGS. 16A to 16C show aberration curves of the first embodiment at a magnification of 1.0×.
Figure 16B:
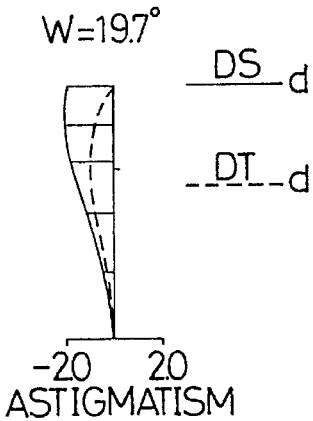
Figure 16C:
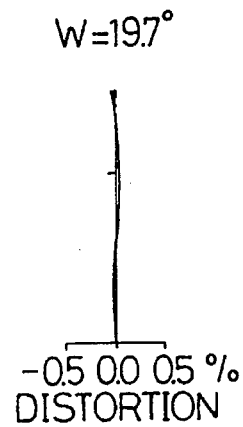
Figure 16D:
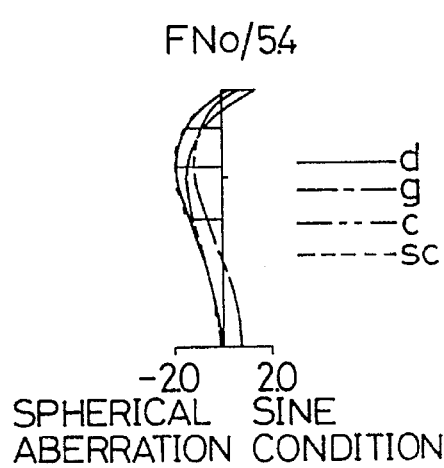
FIGS. 16D to 16F show aberration curves of the first embodiment at a magnification of 0.5×.
Figure 16E:
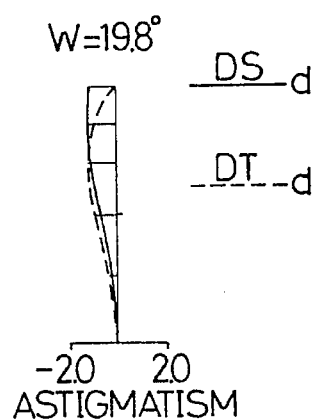
Figure 16F:
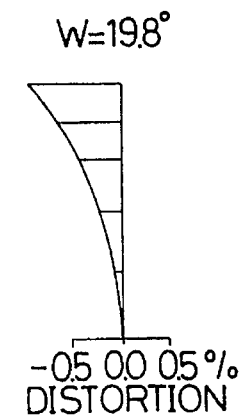
Figure 16G:
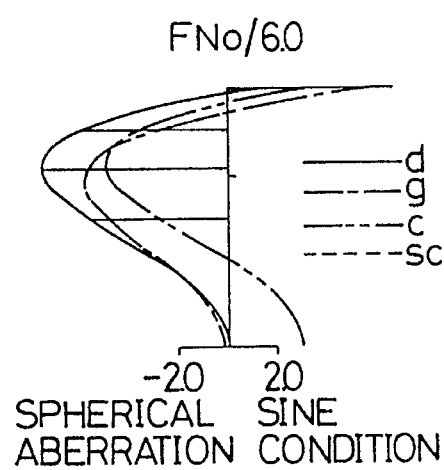
FIGS. 16G to 16I show aberration curves of the first embodiment at a magnification of 2.0×.
Figure 16H:
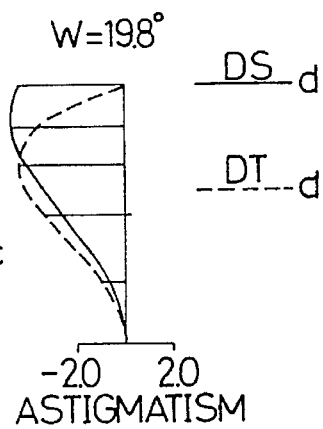
Figure 16I:
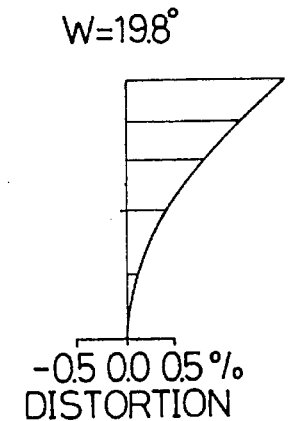
Figure 17A:
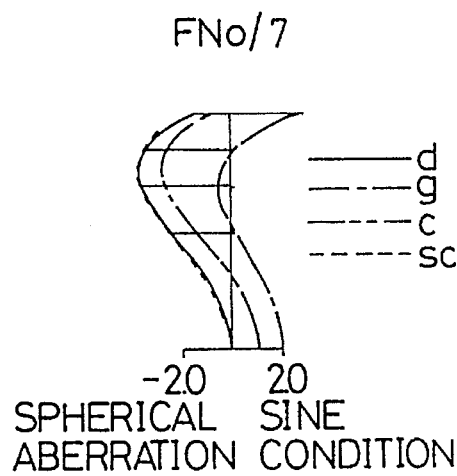
FIGS. 17A to 17C show aberration curves of the second embodiment at a magnification of 1.0×.
Figure 17B:
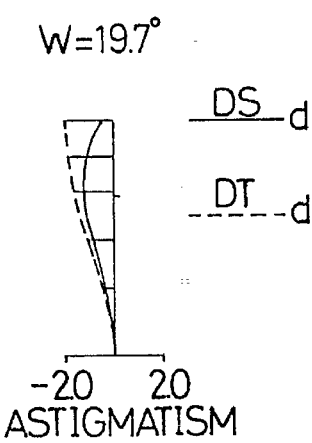
Figure 17C:
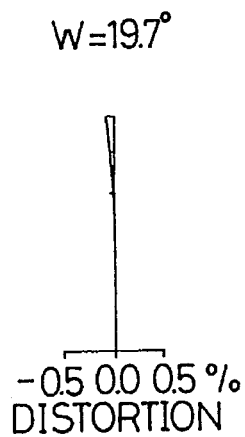
Figure 17D:
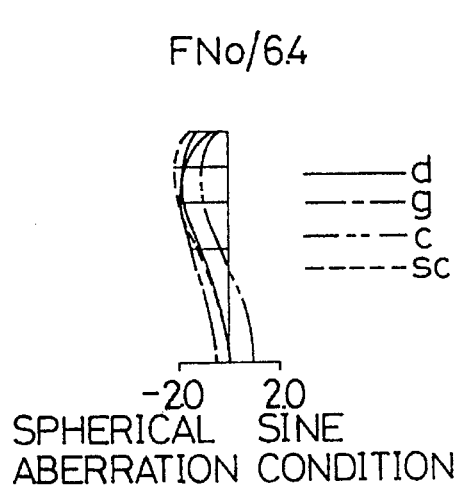
FIGS. 17D to 17F show aberration curves of the second embodiment at a magnification of 0.5×.
Figure 17E:
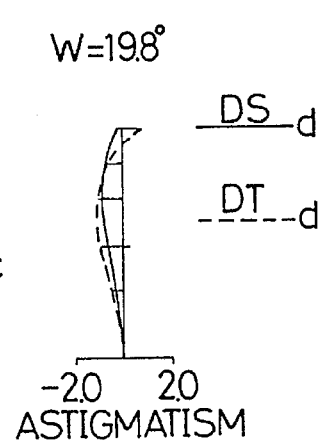
Figure 17F:
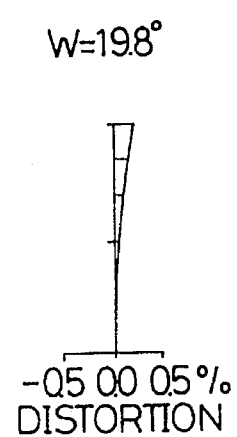
Figure 17G:
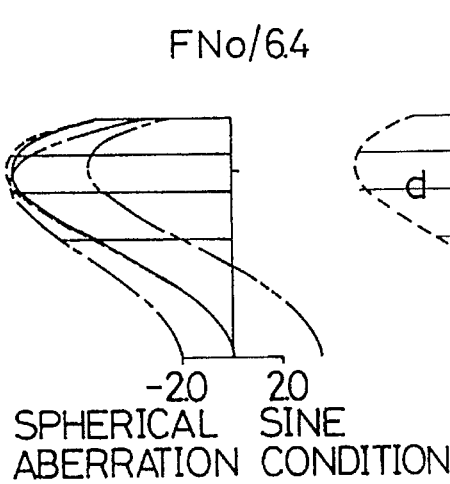
FIGS. 17G to 17I show aberration curves of the second embodiment at a magnification of 2.0×.
Figure 17H:
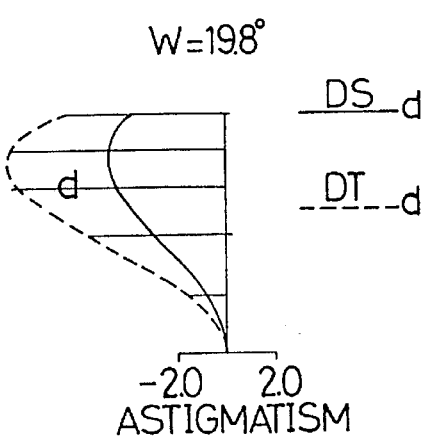
Figure 17I:
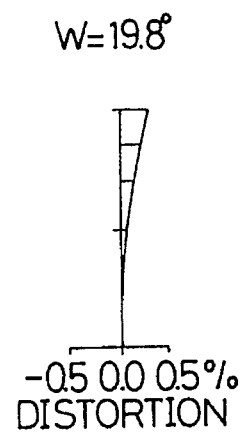
Figure 18A:
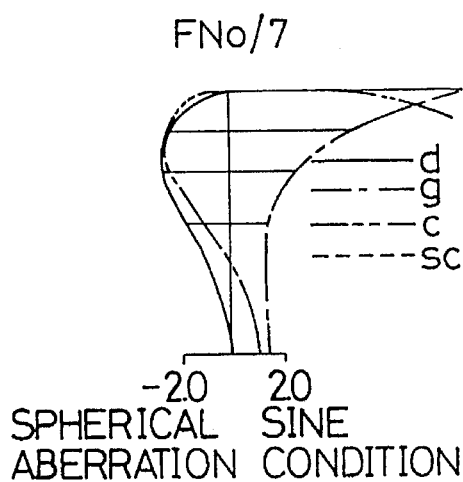
FIGS. 18A to 18C show aberration curves of the third embodiment at a magnification of 1.0×.
Figure 18B:
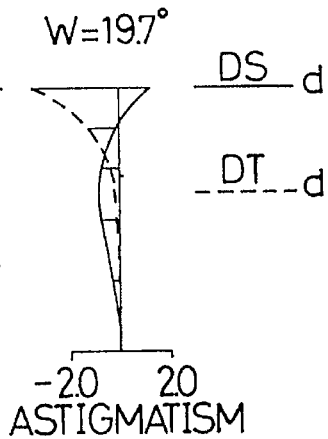
Figure 18C:
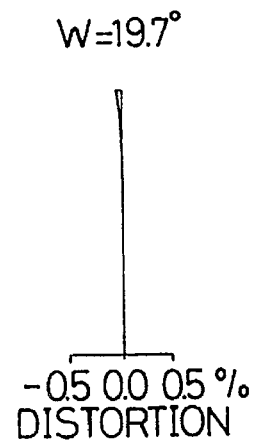
Figure 18D:
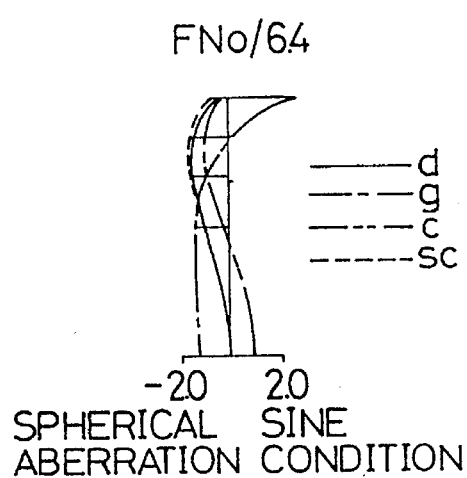
FIGS. 18D to 18F show aberration curves of the third embodiment at a magnification of 0.5×.
Figure 18E:
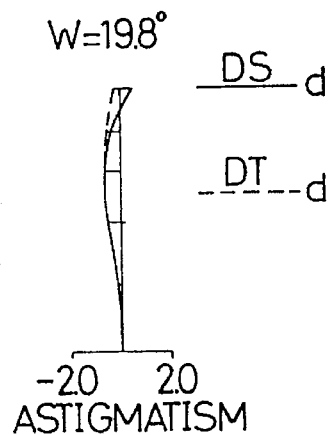
Figure 18F:
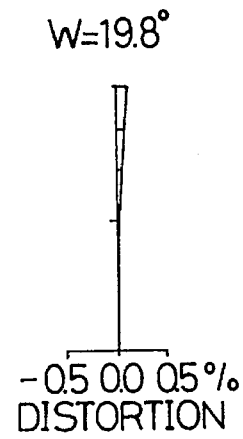
Figure 18G:
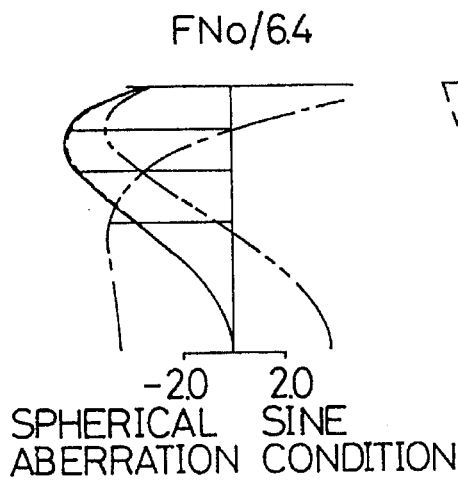
FIGS. 18G to 18I show aberration curves of the third embodiment at a magnification of 2.0×.
Figure 18H:
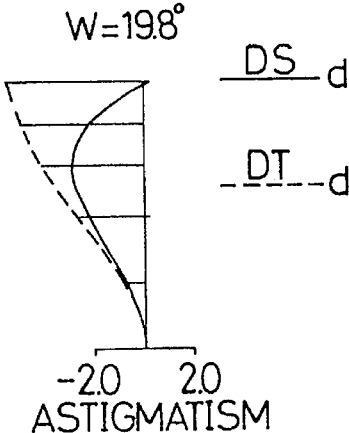
Figure 18I:
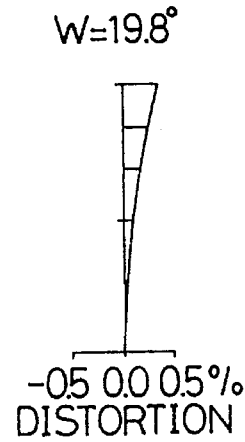
Figure 21A:
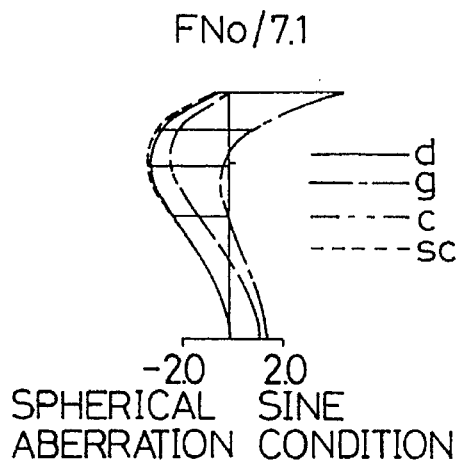
FIGS. 21A to 21C show aberration curves of the sixth embodiment at a magnification of 1.0×.
Figure 21B:
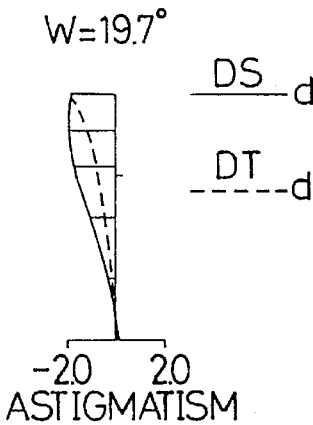
Figure 21C:
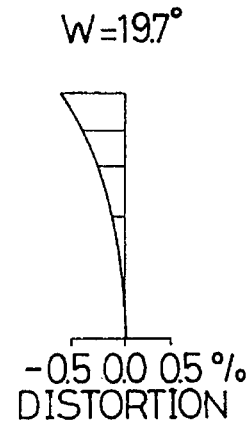
Figure 21D:
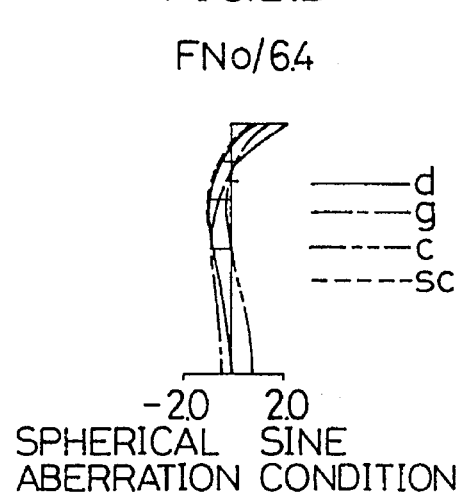
FIGS. 21D to 21F show aberration curves of the sixth embodiment at a magnification of 0.5×.
Figure 21E:
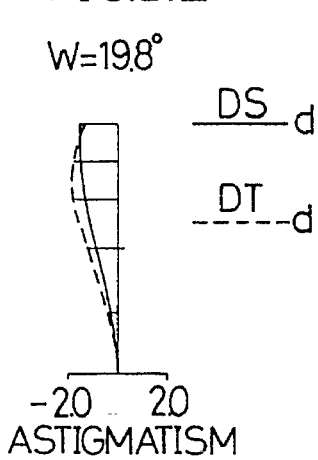
Figure 21F:
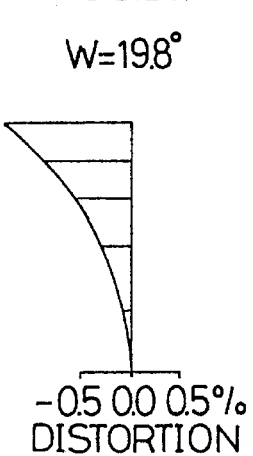
Figure 21G:
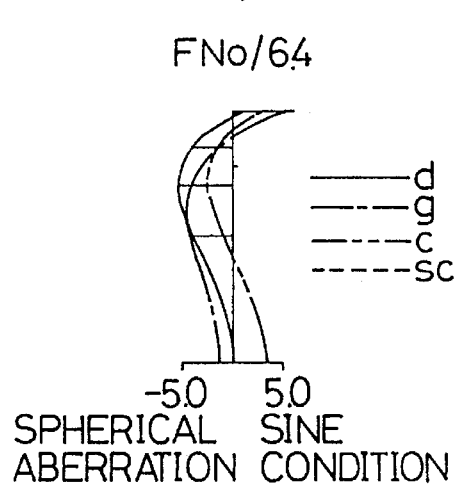
FIGS. 21G to 21I show aberration curves of the sixth embodiment at a magnification of 2.0×.
Figure 21H:
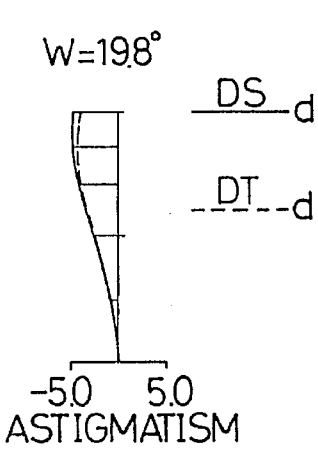
Figure 21I:
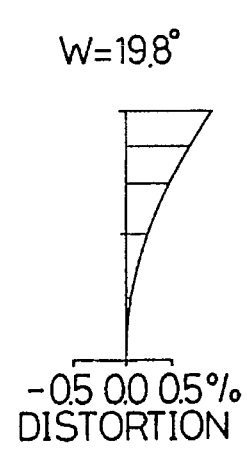
Figure 22A:
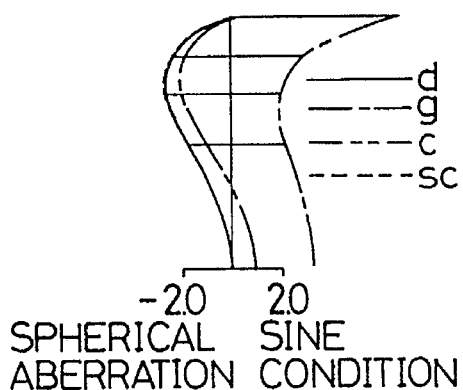
FIGS. 22A to 22C show aberration curves of the seventh embodiment at a magnification of 1.0×.
Figure 22B:
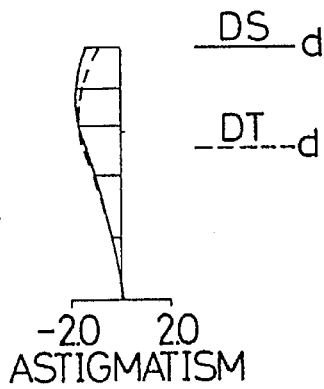
Figure 22C:
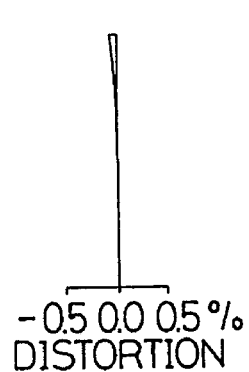
Figure 22D:
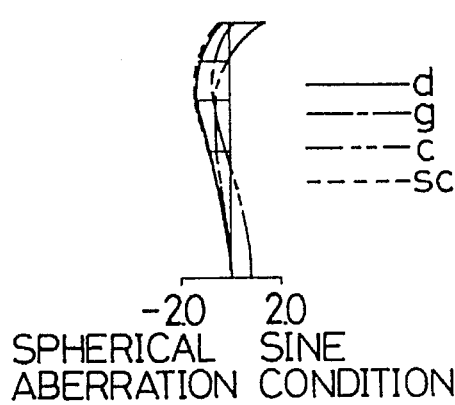
FIGS. 22D to 22F show aberration curves of the seventh embodiment at a magnification of 0.5×.
Figure 22E:
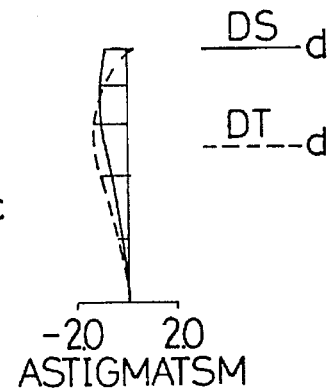
Figure 22F:
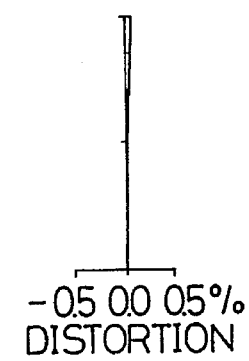
Figure 22G:
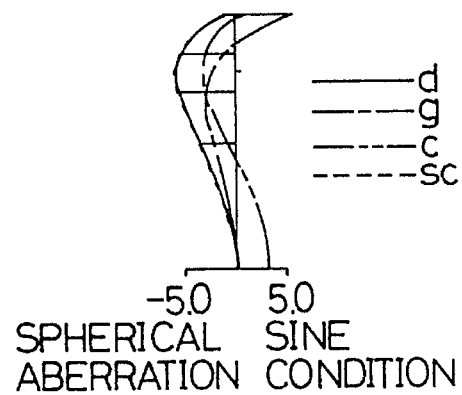
FIGS. 22G to 22I show aberration curves of the seventh embodiment at a magnification of 2.0×.
Figure 22H:
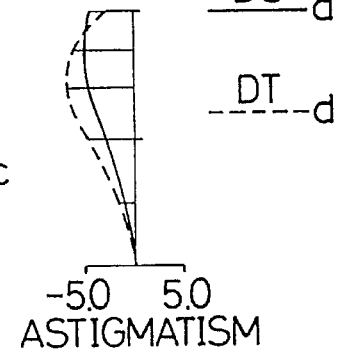
Figure 22I:
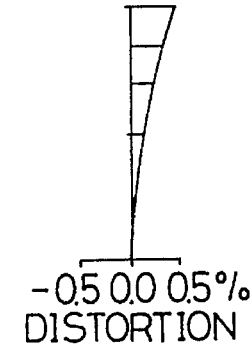
Figure 23A:
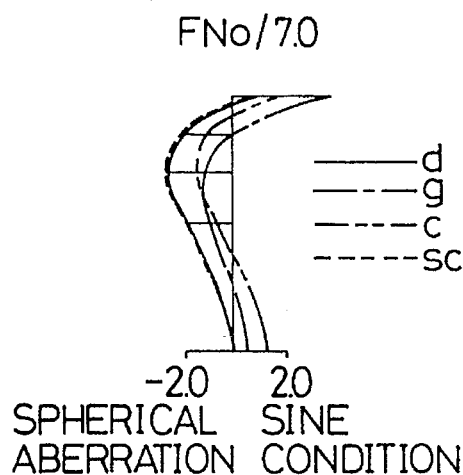
FIGS. 23A to 23C show aberration curves of the eighth embodiment at a magnification of 1.0×.
Figure 23B:
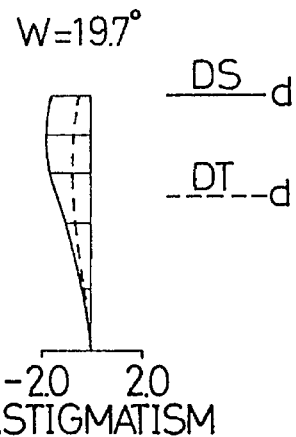
Figure 23C:
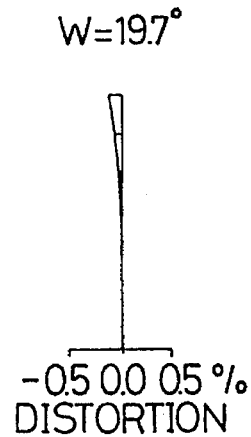
Figure 23D:
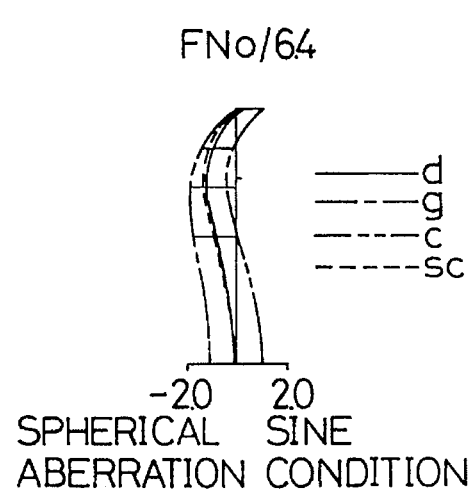
FIGS. 23D to 23F show aberration curves of the eighth embodiment at a magnification of 0.5×.
Figure 23E:
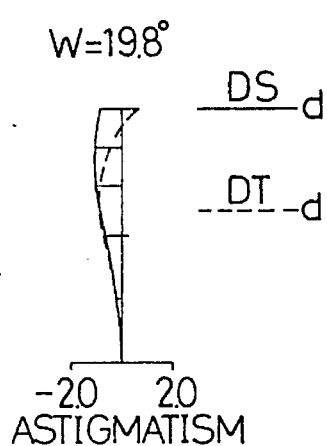
Figure 23F:
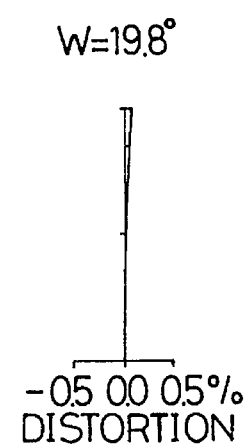
Figure 23G:
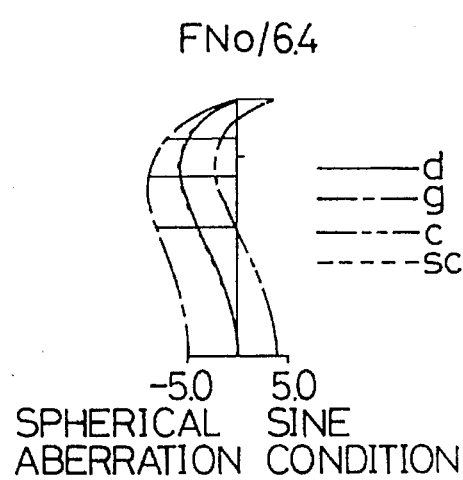
FIGS. 23G to 23I show aberration curves of the eighth embodiment at a magnification of 2.0×.
Figure 23H:
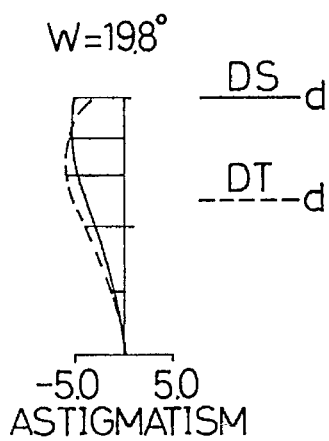
Figure 23I:
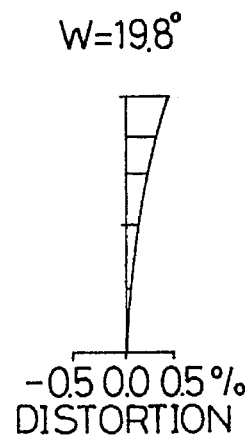
Figure 24A:
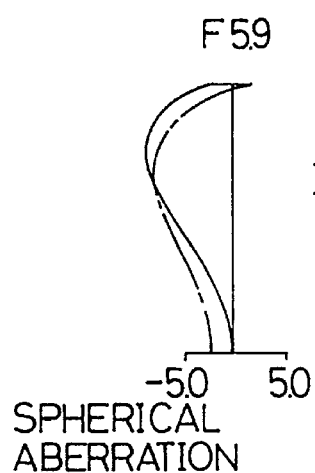
FIGS. 24A to 24C show aberration curves of the ninth embodiment at a magnification of 1.0×.
Figure 24B:
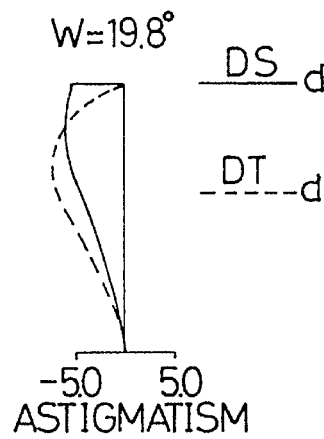
Figure 24C:
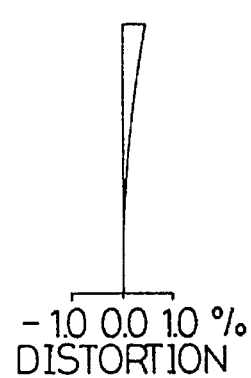
Figure 24D:
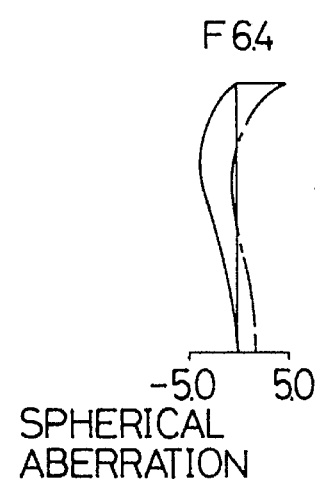
FIGS. 24D to 24F show aberration curves of the ninth embodiment at a magnification of 0.5×.
Figure 24E:
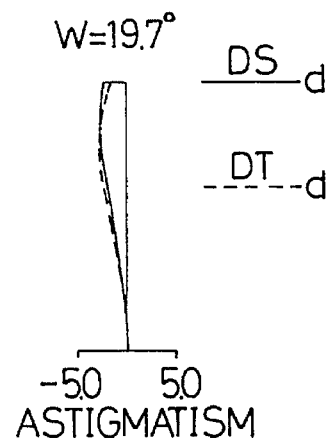
Figure 24F:
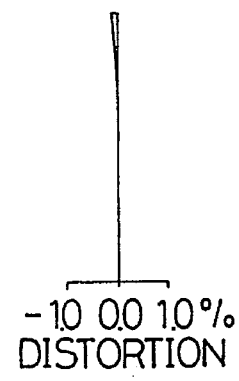
Figure 24G:
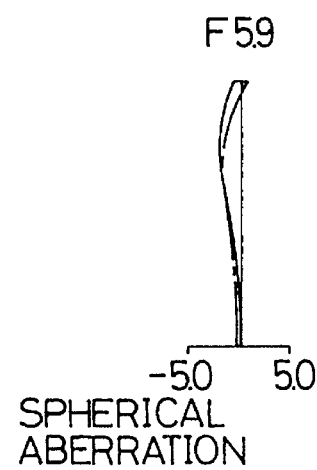
FIGS. 24G to 24I show aberration curves of the ninth embodiment at a magnification of 2.0×.
Figure 24H:
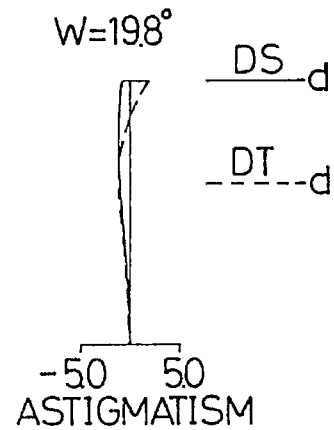
Figure 24I:
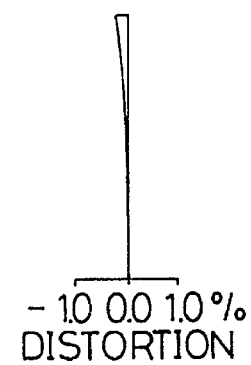
Figure 26A:
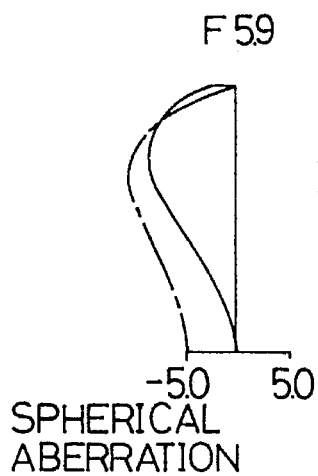
FIGS. 26A to 26C show aberration curves of the eleventh embodiment at a magnification of 1.0×.
Figure 26B:
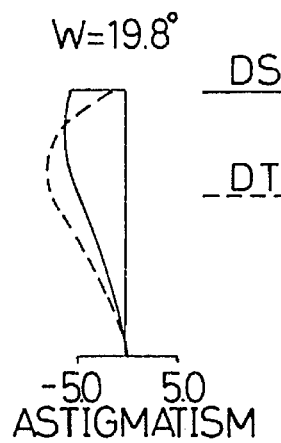
Figure 26C:
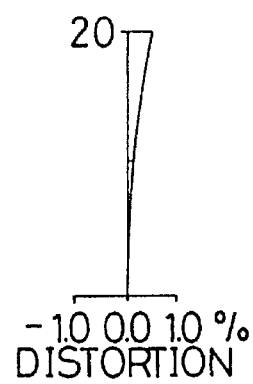
Figure 26D:
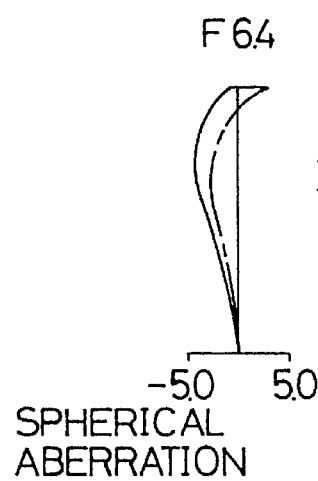
FIGS. 26D to 26F show aberration curves of the eleventh embodiment at a magnification of 0.5×.
Figure 26E:
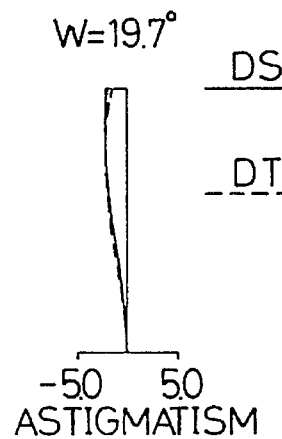
Figure 26F:
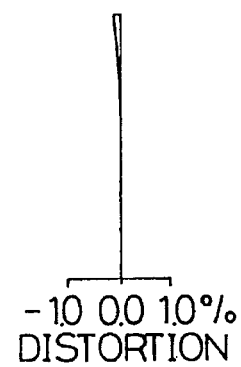
Figure 26G:
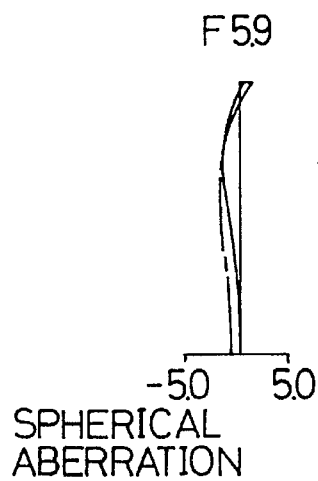
FIGS. 26G to 26I show aberration curves of the eleventh embodiment at a magnification of 2.0×.
Figure 26H:
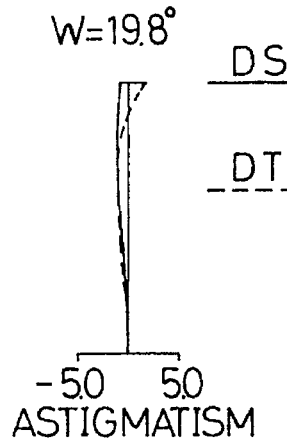
Figure 26I:
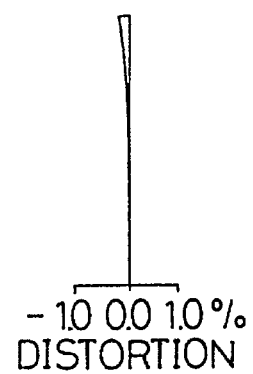

Moreover, for example, like the fifth, seventh and eighth embodiments, when the lens units are moved in a manner as shown in the previously-mentioned FIG. 15 (FIG. 15 shows only the movements of the lens units of each embodiment, and with respect to the lens arrangement, the arrangement of one of the embodiments is shown), the variation in distortion during zooming is restrained. However, the generation of aberrations other than distortion, particularly the generation of coma is increased, so that it is necessary to restrain it. The generation of the aberration is remarkable when the magnification range is large. In this case, if the refractive power of the positive second lens unit is arranged symmetrically with respect to its center, the aberration correction is particularly difficult. In the fifth, seventh and eighth embodiments, by arranging the refractive power of the positive second lens unit asymmetrically, aberrations such as coma is excellently corrected. Thus, in the fifth, seventh and eighth embodiments, since the power arrangement is not extremely asymmetric during zooming, the variation in distortion is not large, and since the power arrangement is not completely symmetric, the generation of aberrations such as coma is not large.

The positive second lens unit of the fifth embodiment includes from the original side two positive meniscus lens elements convex to the original side, a negative meniscus lens element concave to the image side and a bi-convex lens element, and is provided with asymmetry by the positive, positive, negative, positive power arrangement. The positive second lens units of the sixth, seventh and eighth embodiments include from the original side a positive meniscus lens element convex to the original side, a bi-concave lens element and a bi-convex lens element, and is provided with asymmetry by the positive, negative, positive power arrangement.

In the fifth to eighth embodiments, the distance between the first and second lens units and the distance between the second and third lens units are decreased at unity magnification, the distance between the first and second lens units and the distance between the second and third lens units are increased at magnifications other than unity, the first and third lens units are moved away from the second lens unit and the aperture stop is arranged in the second lens unit, so that the positions where the off-axial principal light beam is incident on the lens elements of the first and third lens units are located away from the optical axis during zooming. As a result, the variation in distortion during zooming increases and the generation of other aberrations increases. To correct the aberrations, in the fifth and sixth embodiments, aspherical surfaces are arranged in the first and third lens units in order that the positions where the off-axial principal light beam is incident differ at each magnification, thereby restraining the variation in distortion during zooming. In the sixth to eighth embodiments, an aspherical surface is arranged in the second lens unit to enable the correction of aberrations other than distortion such as coma and spherical aberration with a smaller number of lens elements.

Figure 14:
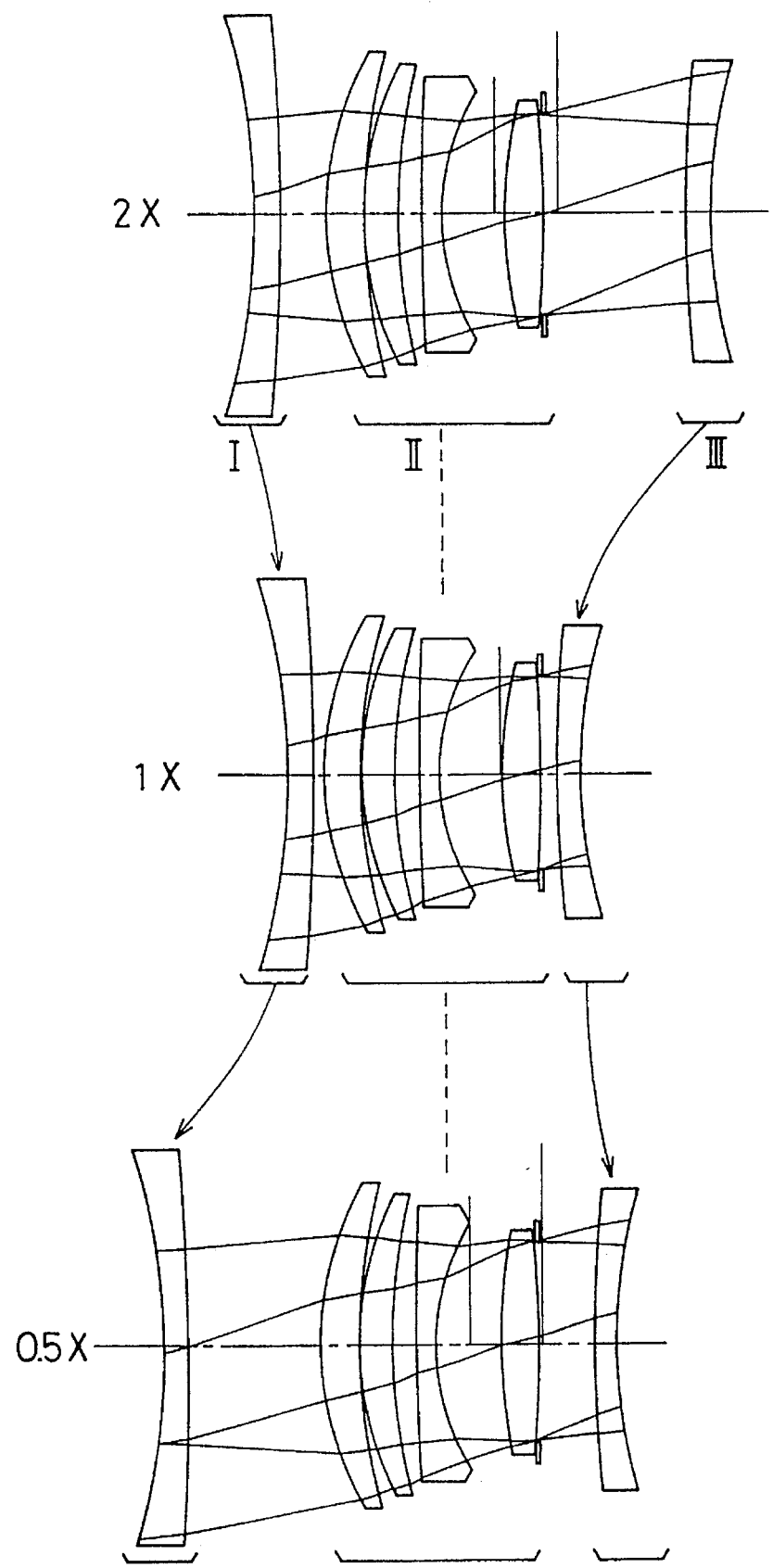
FIG. 14 shows an asymmetric movement of the lens units of the zoom lens of the present invention during zooming.

The lens movement manner, the arrangement of aspherical surfaces and the number of lens elements of the second lens unit will be described with respect to the case where the first and third lens units are moved almost symmetrically with respect to the second lens unit as shown in FIG. 15 and to the case where they are moved asymmetrically as shown in FIG. 14.

In the fifth, seventh and eighth embodiments, the variation in distortion is restrained by moving the first and third lens units substantially symmetrically with respect to the second lens unit at magnifications other than unity.

In this arrangement, in the fifth embodiment, the second lens unit is provided with four lens elements to excellently correct aberrations other than distortion, and in the seventh and eighth embodiments, at least one aspherical surface is arranged in the second lens unit to enable the correction of aberrations other than distortion with a smaller number of lens elements. In the sixth embodiment, the distance between the first and second lens units is small and the distance between the second and third lens units is large at magnifications greater than unity, the distance between the first and second lens units is large and the distance between the second and third lens units is large at magnifications smaller than unity, and the first and third lens units are moved asymmetrically with respect to the second lens unit during zooming. To restrain the variation in distortion in this arrangement, aspherical surfaces are arranged in the second lens unit as well as in the first and third lens units to correct aberrations.

Thus, in the fifth to eighth embodiments, the lens movement manner, the positions where aspherical surfaces are arranged and the number of lens elements of the second lens unit are well-balanced for the correction of aberrations, so that distortion and aberrations other than distortion when the magnification range is large are excellently corrected.

In the fifth to eighth embodiments, the arrangement of aspherical surfaces and the configurations of the aspherical surfaces are as follows:

In the fifth embodiment, the original side surface of the negative meniscus lens element concave to the original side included in the first lens unit is an aspherical surface having its curvature decreasing from the center to the edge along the height, and the image side surface of the negative meniscus lens element concave to the image side included in the third lens unit is an aspherical surface having its curvature increasing from the center to the edge along the height.

In the sixth embodiment, the original side surface of the negative meniscus lens element concave to the original side included in the first lens unit is an aspherical surface having its curvature decreasing from the center to the edge along the height, the original side surface of the positive meniscus lens element convex to the original side included in the second lens unit is an aspherical surface having its curvature decreasing from the center to the edge along the height, and the original side surface of the negative meniscus lens element concave to the image side included in the third lens unit is an aspherical surface having its curvature decreasing from the center to the edge along the height.

In the seventh embodiment, the original side surface of the bi-concave lens element included in the second lens unit is an aspherical surface having its curvature increasing from the center to the edge along the height.

In the eighth embodiment, the original side surface of the positive meniscus lens element convex to the original side included in the second lens unit is an aspherical surface having its curvature decreasing from the center to the edge along the height.

Figure 11:
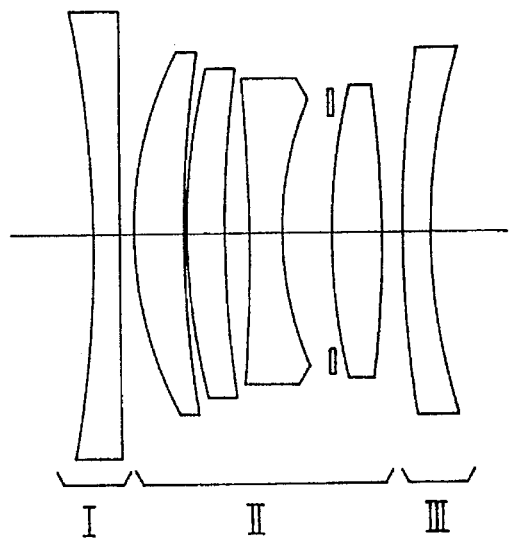
FIG. 11 is a cross-sectional view showing the lens arrangement of a ninth embodiment of the present invention.
Figure 12:
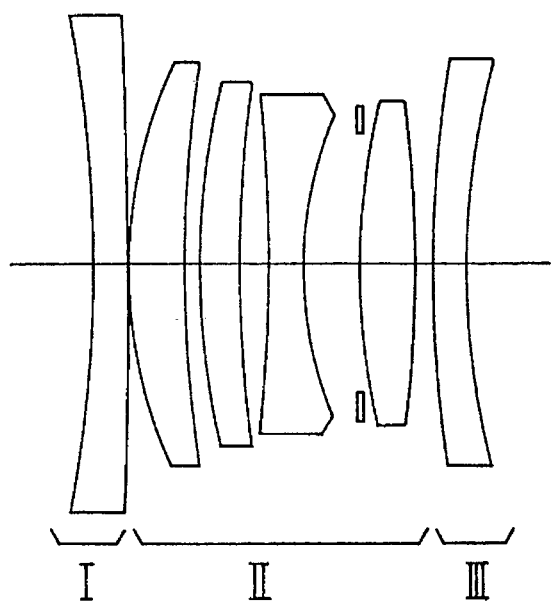
FIG. 12 is a cross-sectional view showing the lens arrangement of a tenth embodiment of the present invention.
Figure 13:
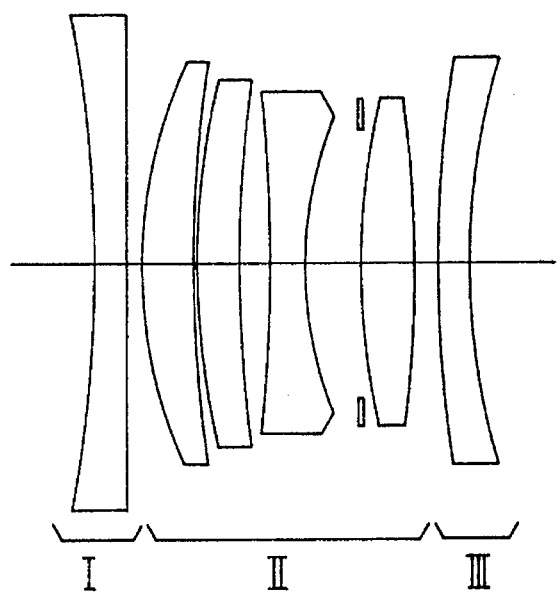
FIG. 13 is a cross-sectional view showing the lens arrangement of an eleventh embodiment of the present invention.

The ninth to eleventh embodiments include, as shown in FIGS. 11 to 13, from the original side a negative first lens unit including at least one negative lens element, a positive second lens unit including at least four lens elements and a third lens unit including at least one negative lens element. The positive second lens unit is asymmetric with respect to its center. During zooming, by varying the distance between the negative first lens unit and the positive second lens unit and the distance between the positive second lens unit and the negative third lens unit and by moving the entire lens system, the projection magnification is varied with the conjugate distance being maintained constant. By providing the positive second lens unit with at least four lens elements, the correction of aberrations such as spherical aberration and field curvature is facilitated even when the F-number is small and the magnification range is large, and by asymmetrically arranging the refractive power of the positive second lens unit, coma is excellently corrected. In the ninth to eleventh embodiments, the variation in distortion during zooming is decreased by moving the first and third lens units substantially symmetrically with respect to the second lens unit during zooming. In addition, in these embodiments, aberrations such as coma generated during zooming are corrected by floating or moving at least one lens element in the second lens unit relative to other lens elements in the second lens unit, that is by varying at least one axial distance in the positive second lens unit during zooming. This feature is effective particularly in a lens unit arrangement where the first and third lens units are moved substantially symmetrically with respect to the second lens unit and the generation of coma is large during zooming. Further, these embodiments fulfill the following condition (3):

$$0.01 < \left| \frac{\Delta dn}{dn} \right| < 1.5 \tag{3}$$

where $\Delta dn$ is a difference in axial distances of those lens elements in the second lens unit which vary during zooming between at unity magnification and at a magnification other than unity, and $dn$ is the axial distance, at unity magnification, of the axial distances of those lens elements in the second lens unit which vary during zooming.

When the lower limit of the condition (3) is exceeded, the correction of coma generated during zooming is insufficient. When the upper limit of the condition (3) is exceeded, coma is overcorrected, so that the quality of the image surface deteriorates.

The positive second lens units of the ninth to eleventh embodiments include from the original side two positive meniscus lens elements convex to the original side, a biconcave lens element strongly concave to the image side and a bi-convex lens element, and is provided with asymmetry by the positive, positive, negative, positive refractive power arrangement. In addition, in the ninth to eleventh embodiments, at least one axial distance in the positive second lens unit is varied during zooming to correct by floating aberrations such as coma generated during zooming. The floated lens elements will be described.

In the ninth embodiment, see Table 10, the bi-concave lens element (G4) of the positive second lens unit is moved or floated during zooming. In the tenth embodiment, the positive meniscus lens element (G3) and the bi-concave lens element (G4) of the positive second lens unit are floated or moved relative to the other lens elements of the second lens unit (but the distance between the positive meniscus lens element and the bi-concave lens element is unchanged). In the eleventh embodiment, the bi-convex lens element of the positive second lens unit is floated.

Figure 2A:
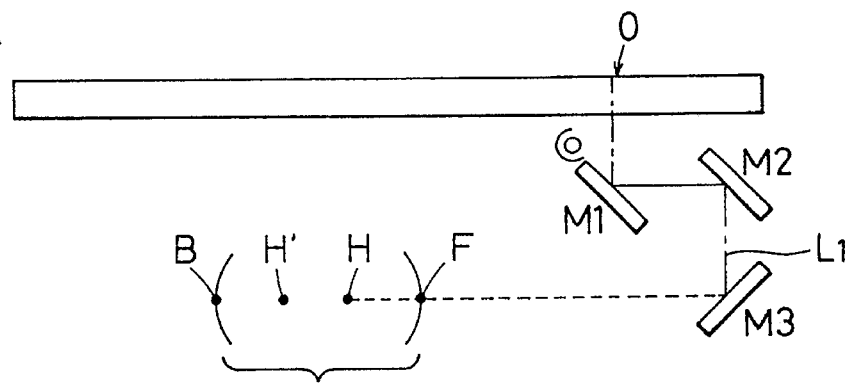
FIGS. 2A and 2B show a condition during zooming in the optical system of the copying machine employing the copying optical system of the present invention.
Figure 2B:
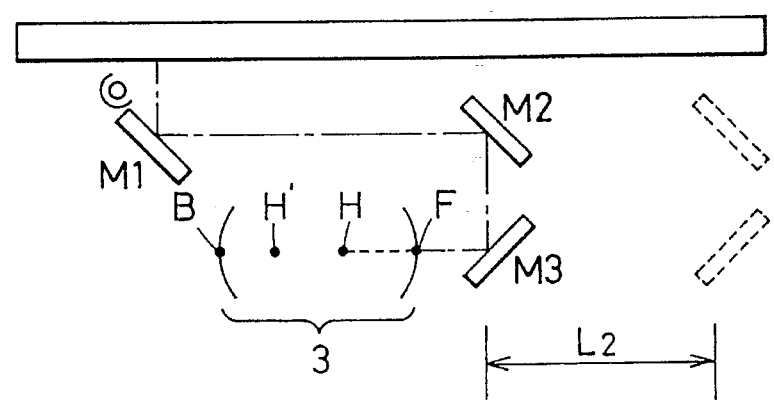
Figure 3:
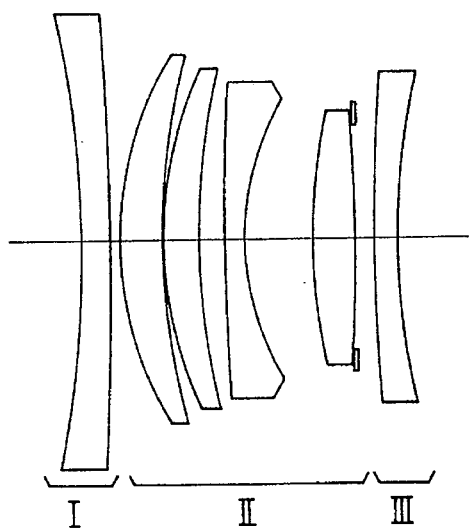
FIG. 3 is a cross-sectional view showing the lens arrangement of a first embodiment of the present invention.
Figure 4:
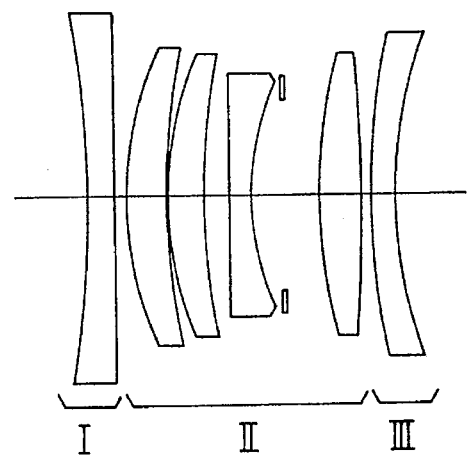
FIG. 4 is a cross-sectional view showing the lens arrangement of a second embodiment of the present invention.
Figure 5:
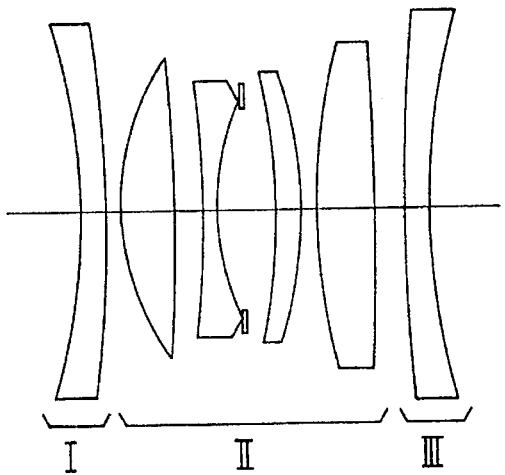
FIG. 5 is a cross-sectional view showing the lens arrangement of a third embodiment of the present invention.
Figure 6:
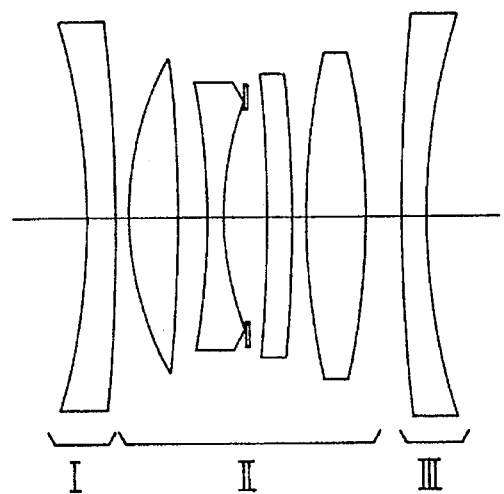
FIG. 6 is a cross-sectional view showing the lens arrangement of a fourth embodiment of the present invention.
Figure 7:
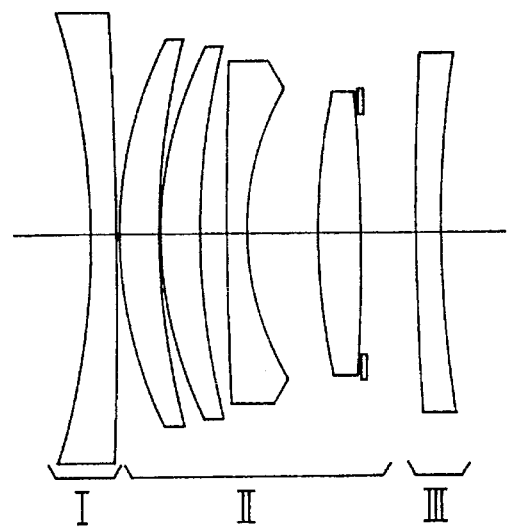
FIG. 7 is a cross-sectional view showing the lens arrangement of a fifth embodiment of the present invention.
Figure 8:
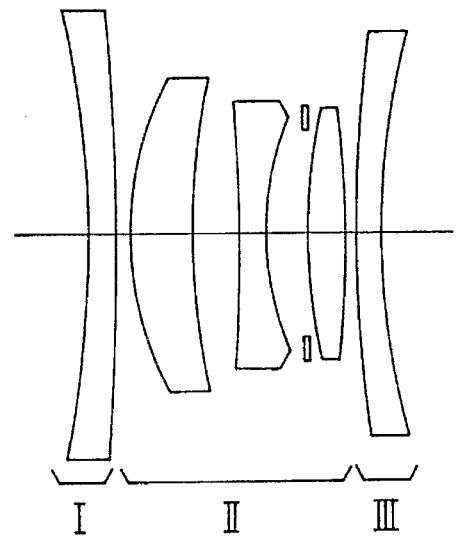
FIG. 8 is a cross-sectional view showing the lens arrangement of a sixth embodiment of the present invention.
Figure 9:
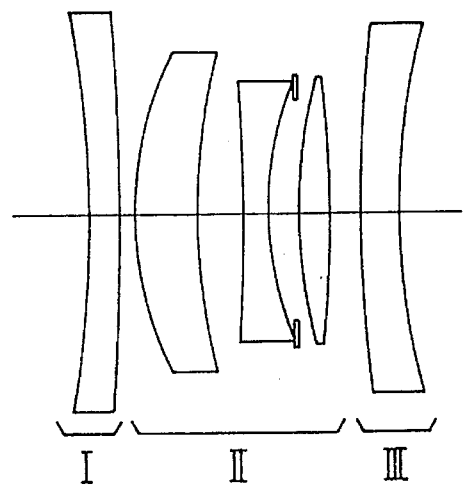
FIG. 9 is a cross-sectional view showing the lens arrangement of a seventh embodiment of the present invention.
Figure 10:
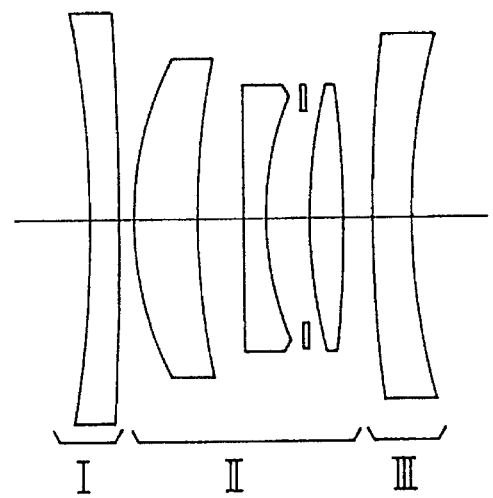
FIG. 10 is a cross-sectional view showing the lens arrangement of an eighth embodiment of the present invention.

The first to eleventh embodiments are of a telephoto type where the front principal point of the entire lens system is located on the original side of the entire lens system, so that the conjugate distance (distance between the original surface and the image formed surface) is reduced and the size of the copying optical system is reduced. This will be explained with reference to FIGS. 1, 2A and 2B. In a copying optical system as shown in FIG. 1, to prevent the contact and interference between the second slider 2 and the zoom lens system 3, the distance from an original surface 0 to an original side end surface F of the zoom lens system 3 is necessarily L1+L2 or larger where L1 is a distance from the original surface 0 to the third mirror M3 at the original scanning start position (this distance depends on a mechanical limitation) and L2 is a movement distance of the third mirror which depends on the original scanning length (this distance corresponds to one-half of the original scanning length and the preliminary scanning length). By this condition, the distance from the original surface 0 to the original side end surface F of the lens at unity magnification is $$2f\beta=-1-FH\beta=-1>L1+L2\beta=-1 \quad (A)$$

where $f\beta=-1$ is a focal length of the lens system 3 at unity magnification, and $FH\beta=-1$ is a distance from the front principal point H of the zoom lens system 3 during zooming to the original side end surface F of the zoom lens system 3 at unity magnification. FH>0 when the front principal point H is located on the image side of the original side end surface of the lens, and FH<0 when it is located on the original side of the original side end surface.

In a zoom lens system with a constant conjugate distance like the zoom lens systems of the present invention, the conjugate distance L is defined by $$L=2f\beta=-1+HH'\beta=-1+2f\beta=1 \quad (B)$$

where L3 is a distance from the image side end surface B of the zoom lens system 3 to the photoreceptor which is the image surface at unity magnification, $BH'\beta=-1$ is a distance from the rear principal point H' to the image side surface B of the lens at unity magnification, and $HH'\beta=-1$ is a distance from the front principal point H to the rear principal point H' at unity magnification. When the magnification is 2.0×, it is necessary to move the zoom lens system 3 by $2f\beta=\frac{1}{3}$ toward the original side. The following relationship necessarily holds:

$$2f\beta=-1-(\frac{2}{3})f\beta=-1-FH\beta=-2>L1+L2\beta=-2 \quad (C)$$

where $f\beta=-2$ is a focal length of the zoom lens system 3 when the magnification is 2.0×, $FH\beta=-2$ is a distance from the front principal point H of the zoom lens system 3 to the original side end surface F of the zoom lens system 3 when the magnification is 2.0×, and $L2\beta=-2$ is a movement distance of the second slider.

To reduce the size of the entire copying optical system, it is necessary to reduce the conjugate distance L. To reduce the conjugate distance L, $f\beta=-1$ and $HH'\beta=-1$ of the expression (B) are reduced. However, by the limitations of the expressions (A) and (C), to reduce the focal length, $FH\beta=-1$ and $FH\beta=-2$ are reduced or made negative. That is, it is necessary to locate the front principal point H of the lens on the side of the original side end surface of the lens or on the original side of the original side end surface. In a general conjugate distance varifocal zoom lens system of completely symmetric type, approximately $FH\beta=-1=0.25f\beta=-1$ (see Japanese Laid-open Patent Application No. S62-123412), and although the focal length of the lens and the conjugate distance increase to increase the size of the copying optical system, the front principal point of the lens is located close to the original side end surface of the lens at unity magnification and at magnifications other than unity. In a lens system where the front principal point is located on the original side of the original side end surface, the size of the copying optical system is reduced by largely reducing the focal length of the lens and the conjugate distance. In the first to eleventh embodiments, by setting the value of $FH\beta=-1/f\beta=-1$ as shown in Table 1, the front principal point of the lens is located on the original side of the entire lens system (in the first to third and fifth embodiments, the front principal point of the lens is located very close to the original side end surface of the lens) to reduce $f\beta=-1$ to enable the reduction in conjugate distance.

In the first to eleventh embodiments, the front principal point of the lens is located on the original side of the entire lens system at unity magnification and at magnifications other than unity, so that the focal length of the lens and the conjugate distance are reduced. Further, these embodiments include from the original side a negative first lens unit including at least one negative lens element, a positive second lens unit including at least three lens elements and a negative third lens unit including at least one negative lens element. The positive second lens unit is asymmetric with respect to its center. During zooming, by varying the distance between the negative first lens unit and the positive second lens unit and the distance between the positive second lens unit and the negative third lens unit and by moving the entire lens system, the projection magnification is varied with the conjugate distance being maintained constant. Further, the following conditions (4) and (5) are fulfilled:

$$0.5 > \frac{FH2}{\Sigma d2} \quad (4)$$

$$0.2 > \frac{FH\beta=-1}{f\beta=-1} > -0.10 \quad (5)$$

where FH2 is a position of a front principal point of the positive second lens unit at unity magnification, $\Sigma d2$ is an axial thickness of the positive second lens unit at unity magnification, $FH\beta=-1$ is a position of a front principal point of the entire lens system at unity magnification, and $f\beta=-1$ is a focal length of the entire lens system at unity magnification.

When the upper limit of the condition (4) is exceeded, the asymmetry of the positive second lens unit is weakened, so that it is difficult to locate the front principal point of the entire lens system close to the original side end surface, and the correction of aberrations such as coma is difficult. When the upper limit of the condition (5) is exceeded, the front principal point of the lens is located farther away from the original side end surface of the lens, so that it is difficult to reduce the focal length. Further, when the lower limit of the condition (5) is exceeded, the entire lens system has a strong asymmetry, so that the variation in distortion during zooming is large.

By further fulfilling the following condition (6) like in the first to eleventh embodiments, the focal length of the lens and the conjugate distance can further be reduced:

$$0.1 > \frac{FH\beta = -1}{f\beta = -1} \quad (6)$$

By further fulfilling the following condition (7) like in the first to eleventh embodiments, the focal length of the lens and the conjugate distance can further be reduced:

$$0.06 > \frac{FH\beta = -1}{f\beta = -1} \quad (7)$$

By locating the front principal point of the entire lens system very close to the original side end surface and by fulfilling the following condition (8) like in the first to third, fifth and seventh embodiments, the focal length of the lens and the conjugate distance can further be reduced:

$$0.04 > \frac{FH\beta = -1}{f\beta = -1} \quad (8)$$

Numerical data of the first to seventh embodiments are shown in Tables 2 to 12. In the tables, ri (i=1 to 13) is a radius of curvature of an ith surface counted from the original side, di (i=1 to 12) is an axial distance between an ith lens surface and an i+1 th lens surface, Ni (i=1 to 6) is a refractive index of an ith lens counted from the original side to the d-line (refractive index between lenses is 1.00), and $\upsilon$i (i=1 to 6) is an Abbe number of an ith lens counted from the enlargement side. f is a focal length of the zoom lens system. The focal lengths at magnifications of $\beta=-1.0$ (unity magnification), $\beta=-0.5$ (in reduction) and $\beta=-2.0$ (in magnification) are shown in this order. FNO is an F-number of the zoom lens system. The F-numbers at magnifications of $\beta=-1.0$, $\beta=-0.5$ and $\beta=-2.0$ are shown in this order. d12E is a distance between the negative first lens unit and the positive second lens unit at the enlargement end ($\beta=-2.0$). d12R is a distance between the negative first lens unit and the positive second lens unit at the reduction end ($\beta=-0.5$). d23E is a distance between the negative second lens unit and the positive third lens unit at the enlargement end ($\beta=-2.0$). d23R is a distance between the negative second lens unit and the positive third lens unit at the reduction end ($\beta=-0.5$). $\Delta$dn is a difference in axial distances in the second lens unit which vary during zooming between at unity magnification and at a magnification other than unity. dn is the axial distance, at unity magnification, of the axial distances in the second lens which vary during zooming. FH2 is a position of a front principal point of the positive second lens unit at unity magnification (represented by a distance from the first surface of the lens at unity magnification). $\Sigma$d2 is an axial thickness of the positive second lens unit. The axial thicknesses at magnifications of $\beta=-1.0$, $\beta=-0.5$ and $\beta=-2.0$ are shown in this order. FH$\beta=-1$ is a position of the front principal point of the entire lens system. f$\beta=-1$ is a focal length of the entire lens system at unity magnification. In the tables, surfaces marked with asterisks (*) are aspherical and defined by the following expression:

$$x = \frac{C_o\Phi 2}{1 + (1 - \epsilon C_o 2\Phi 2)^{1/2}} + \Sigma Ai\Phi i$$

where x is a coordinate from the vertex of the lens along the optical axis, $C_o$ is a paraxial curvature of the aspherical surface, $\Phi$ is a height from the optical axis, Ai (i=2 to 10) is a higher-order parameter, and $\epsilon$ is a conic constant.

The first to eighth embodiments fulfill the conditions (1), (2), (4), (5) and (6).

The ninth to eleventh embodiments fulfill the conditions (1), (2), (3), (4), (5) and (6).

As described above, according to the copying zoom lens systems of the present invention, the refractive power arrangement of the entire lens system is not extremely symmetric even during zooming, so that aberrations are excellently corrected even when the magnification range is large and the F-number is comparatively small.

Further, when the front principal point of the entire lens system is located on the original side of the lens, the focal length of the lens and the conjugate distance can be reduced, so that the size of the copying optical system is reduced.

Obviously, many modifications and variations of the present invention are possible in light of the above teachings. It is therefore to be understood that within the scope of the appended claims, the invention may be practiced other than as specifically described.

TABLE 1

|  | $\frac{FH\beta = -1}{f\beta = -1}$ |
|---|---|
| 1st embodiment | 0.025 |
| 2nd embodiment | 0.028 |
| 3rd embodiment | 0.031 |
| 4th embodiment | 0.061 |
| 5th embodiment | 0.017 |
| 6th embodiment | 0.057 |
| 7th embodiment | 0.038 |
| 8th embodiment | 0.038 |
| 9th embodiment | 0.049 |
| 10th embodiment | 0.043 |
| 11th embodiment | 0.051 |

TABLE 2

(1st Embodiment)

f = 209.9 to 185.5 to 185.5  $F_{H\beta=-1}/f_{\beta=-1} = 0.025$
$F_{NO}$ = 6.0 to 5.4 to 5.4  $\Sigma d = 43.976$ to 67.754 to 67.800
$d_{12E}/d_{12R} = 0.35$  $F_{H2\beta=-1}/\Sigma d_{2\beta=-1} = 0.301$
$d_{23E}/d_{23R} = 2.59$

| | Radius of Curvature | | Axial Distance | | Refractive Index | | Abbe Number |
|---|---|---|---|---|---|---|---|
| r1 | −123.71 | | | | | | |
| | | d1 | 3.6 | | N1 | 1.5407 v1 | 47.2 |
| r2 | −466.47 | | | | | | |
| | | d2 | 1.474 to 19.607 to 6.800 | | | | |
| r3 | 53.30 | | | | | | |
| | | d3 | 5.5 | | N2 | 1.7130 v2 | 53.9 |
| r4 | 95.59 | | | | | | |
| | | d4 | 0.3 | | | | |
| r5 | 55.00 | | | | | | |
| | | d5 | 5.0 | | N3 | 1.7130 v3 | 53.9 |
| r6 | 100.00 | | | | | | |
| | | d6 | 3.7 | | | | |
| r7 | 488.47 | | | | | | |
| | | d7 | 3.0 | | N4 | 1.5927 v4 | 35.5 |
| r8 | 37.89 | | | | | | |
| | | d8 | 9.6 | | | | |
| r9 | 85.55 | | | | | | |
| | | d9 | 5.8 | | N5 | 1.7495 v5 | 50.0 |
| r10 | −208.79 | | | | | | |
| | | d10 | 0.0 | | | | |
| r11 | Aperture stop | | | | | | |
| | | d11 | 2.502 to 8.147 to 21.00 | | | | |
| r12 | 264.94 | | | | | | |
| | | d12 | 3.5 | | N6 | 1.5174 v6 | 52.2 |
| r13 | 96.22 | | | | | | |

TABLE 3

(2nd Embodiment)

f = 209.5 to 185.5 to 185.5  $F_{H\beta=-1}/f_{\beta=-1} = 0.028$
$F_{NO}$ = 7.0 to 6.4 to 6.4  $\Sigma d$ = 42.992 to 65.179 to 65.000
$d_{12E}/d_{12R} = 1.06$  $F_{H2\beta=-1}/\Sigma d_{2\beta=-1} = 0.316$
$d_{23E}/d_{23R} = 0.92$

| Radius of Curvature | | Axial Distance | | Refractive Index | | Abbe Number |
|---|---|---|---|---|---|---|
| r1 | −155.19 | | | | | |
| | | d1 | 3.6 | N1 | 1.5182 v1 | 59.0 |
| r2 | 2083.90 | | | | | |
| | | d2 | 1.517 to 13.232 to 14.000 | | | |
| r3 | 52.85 | | | | | |
| | | d3 | 5.5 | N2 | 1.7130 v2 | 53.9 |
| r4 | 100.24 | | | | | |
| | | d4 | 0.3 | | | |
| r5 | 53.45 | | | | | |
| | | d5 | 5.0 | N3 | 1.7130 v3 | 53.9 |
| r6 | 96.42 | | | | | |
| | | d6 | 3.7 | | | |
| r7 | 1163.05 | | | | | |
| | | d7 | 3.0 | N4 | 1.5927 v4 | 35.5 |
| r8 | 37.46 | | | | | |
| | | d8 | 4.6 | | | |
| r9 | Aperture stop | | | | | |
| | | d9 | 5.0 | N5 | 1.7495 v5 | 50.0 |
| r10 | 77.57 | | | | | |
| | | d10 | 5.8 | | | |
| r11 | −240.25 | | | | | |
| | | d11 | 1.457 to 11.947 to 11.00 | | | |
| r12 | 120.34 | | | | | |
| | | d12 | 3.5 | N6 | 1.5407 v6 | 47.2 |
| r13 | 69.30 | | | | | |

TABLE 4

(3rd Embodiment)

f = 209.7 to 185.5 to 185.5  $F_{H\beta=-1}/f_{\beta=-1} = 0.031$
$F_{NO}$ = 7.0 to 6.4 to 6.4  $\Sigma d$ = 48.587 to 71.340 to 71.351
$d_{12E}/d_{12R} = 1.03$  $F_{H2\beta=-1}/\Sigma d_{2\beta=-1} = 0.322$
$d_{23E}/d_{23R} = 0.98$

| Radius of Curvature | | Axial Distance | | Refractive Index | | Abbe Number |
|---|---|---|---|---|---|---|
| r1 | −86.91 | | | | | |
| | | d1 | 3.6 | N1 | 1.5407 v1 | 47.2 |
| r2 | −184.61 | | | | | |
| | | d2 | 1.991 to 12.599 to 13.000 | | | |
| r3 | 39.66 | | | | | |
| | | d3 | 7.0 | N2 | 1.7495 v2 | 35.2 |
| r4 | −287.93 | | | | | |
| | | d4 | 4.3 | | | |
| r5 | −124.74 | | | | | |
| | | d5 | 2.2 | N3 | 1.8052 v3 | 25.4 |
| r6 | 38.71 | | | | | |
| | | d6 | 3.5 | | | |
| r7 | Aperture stop | | | | | |
| | | d7 | 4.6 | N4 | 1.6398 v4 | 34.6 |
| r8 | −87.56 | | | | | |
| | | d8 | 3.5 | | | |
| r9 | −59.75 | | | | | |
| | | d9 | 2.2 | N5 | 1.7755 v5 | 37.9 |
| r10 | 86.90 | | | | | |
| | | d10 | 8.0 | | | |
| r11 | −605.51 | | | | | |
| | | d11 | 4.245 to 16.391 to 16.00 | | | |
| r12 | 271.91 | | | | | |
| | | d12 | 3.5 | N6 | 1.5407 v6 | 47.2 |
| r13 | 97.19 | | | | | |

TABLE 5

(4th Embodiment)

f = 209.6 to 185.5 to 185.5  $F_{H\beta=-1}/f_{\beta=-1} = 0.061$
$F_{NO}$ = 7.0 to 6.4 to 6.4  $\Sigma d$ = 48.834 to 68.449 to 68.479
$d_{12E}/d_{12R} = 1.03$  $F_{H2\beta=-1}/\Sigma d_{2\beta=-1} = 0.421$
$d_{23E}/d_{23R} = 0.98$

| Radius of Curvature | | Axial Distance | | Refractive Index | | Abbe Number |
|---|---|---|---|---|---|---|
| r1 | −92.35 | | | | | |
| | | d1 | 3.6 | N1 | 1.4875 v1 | 70.4 |
| r2 | −243.37 | | | | | |
| | | d2 | 1.671 to 12.589 to 13.000 | | | |
| r3 | 43.92 | | | | | |
| | | d3 | 7.0 | N2 | 1.7495 v2 | 35.2 |
| r4 | −176.58 | | | | | |
| | | d4 | 3.9 | | | |
| r5 | −95.11 | | | | | |
| | | d5 | 2.2 | N3 | 1.8052 v3 | 25.4 |
| r6 | 42.63 | | | | | |
| | | d6 | 3.0 | | | |
| r7 | Aperture stop | | | | | |
| | | d7 | 3.0 | N4 | 1.6398 v4 | 34.6 |
| r8 | −183.19 | | | | | |
| | | d8 | 3.5 | | | |
| r9 | −222.43 | | | | | |
| | | d9 | 1.8 | N5 | 1.7755 v5 | 37.9 |
| r10 | 117.83 | | | | | |
| | | d10 | 8.0 | | | |
| r11 | −90.56 | | | | | |
| | | d11 | 4.684 to 16.381 to 16.00 | | | |
| r12 | 224.68 | | | | | |
| | | d12 | 3.5 | N6 | 1.5407 v6 | 47.2 |
| r13 | 90.28 | | | | | |

TABLE 6

(5th Embodiment)

f = 210.1 to 185.5 to 185.5  $F_{H\beta=-1}/f_{\beta=-1} = 0.017$
$F_{NO}$ = 7.1 to 6.4 to 6.4  $\Sigma d$ = 48.071 to 70.916 to 71.000
$d_{12E}/d_{12R} = 0.99$  $F_{H2\beta=-1}/\Sigma d_{2\beta=-1} = 0.241$
$d_{23E}/d_{23R} = 1.01$

| Radius of Curvature | | Axial Distance | | Refractive Index | | Abbe Number |
|---|---|---|---|---|---|---|
| r1 | −110.49(*) | | | | | |
| | | d1 | 3.6 | N1 | 1.5407 v1 | 47.2 |
| r2 | −748.67 | | | | | |
| | | d2 | 0.549 to 11.072 to 11.000 | | | |
| r3 | 55.95 | | | | | |
| | | d3 | 5.5 | N2 | 1.7425 v2 | 52.5 |
| r4 | 121.21 | | | | | |
| | | d4 | 0.3 | | | |
| r5 | 55.84 | | | | | |
| | | d5 | 5.0 | N3 | 1.7130 v3 | 53.9 |
| r6 | 97.40 | | | | | |
| | | d6 | 3.7 | | | |

TABLE 6-continued

| | | | | | | | |
|---|---|---|---|---|---|---|---|
| r7 | 507.12 | | | | | | |
| | | d7 | 3.0 | | N4 1.5927 | v4 | 35.5 |
| r8 | 38.87 | | | | | | |
| | | d8 | 9.6 | | | | |
| r9 | 95.50 | | | | | | |
| | | d9 | 5.8 | | N5 1.7725 | v5 | 49.8 |
| r10 | −238.66 | | | | | | |
| | | d10 | 0.0 | | | | |
| r11 | Aperture stop | | | | | | |
| | | d11 | 7.522 to 19.843 to 20.00 | | | | |
| r12 | 358.85 | | | | | | |
| | | d12 | 3.5 | | N6 1.5174 | v6 | 52.2 |
| r13 | 129.62(*) | | | | | | |

Aspherical Coefficients r1 : ε = 1.0000
A2 = 0.0
A4 = 0.1632 × 10⁻⁶
A6 = −0.1216 × 10⁻⁹
A8 = 0.7421 × 10⁻¹⁶
A10 = −0.2790 × 10⁻²¹ r13 : ε = 1.00000
A2 = 0.0
A4 = 0.3662 × 10⁻⁶
A6 = −0.2303 × 10⁻⁹
A8 = −0.8562 × 10⁻¹⁶
A10 = −0.3911 × 10⁻²¹

TABLE 7

(6th Embodiment)

$f = 210.1$ to $185.5$ to $185.5$  $F_{H\beta=-1}/f_{\beta=-1} = 0.057$
$F_{NO} = 7.1$ to $6.4$ to $6.4$  $\Sigma d = 39.313$ to $77.307$ to $81.963$
$d_{12E}/d_{12R} = 0.54$  $F_{H2\beta=-1}/\Sigma d_{2\beta=-1} = 0.332$
$d_{23E}/d_{23R} = 2.10$

| | Radius of Curvature | | Axial Distance | | Refractive Index | | Abbe Number |
|---|---|---|---|---|---|---|---|
| r1 | −126.00(*) | | | | | | |
| | | d1 | 3.8 | | N1 1.5168 | v1 | 64.2 |
| r2 | −32.97 | | | | | | |
| | | d2 | 1.878 to 26.079 to 13.990 | | | | |
| r3 | 44.55(*) | | | | | | |
| | | d3 | 8.3 | | N2 1.6968 | v2 | 56.5 |
| r4 | 94.80 | | | | | | |
| | | d4 | 6.3 | | | | |
| r5 | −299.62 | | | | | | |
| | | d5 | 3.7 | | N3 1.5927 | v3 | 35.5 |
| r6 | 43.04 | | | | | | |
| | | d6 | 5.0 | | | | |
| r7 | Aperture stop | | | | | | |
| | | d7 | 0.5 | | | | |
| r8 | 81.18 | | | | | | |
| | | d8 | 4.9 | | N4 1.7725 | v4 | 49.8 |
| r9 | −135.02 | | | | | | |
| | | d9 | 1.461 to 15.255 to 32.000 | | | | |
| r10 | 179.97 | | | | | | |
| | | d10 | 3.6 | | N5 1.5168 | v5 | 64.2 |
| r11 | 105.37(*) | | | | | | |

Aspherical Coefficients

TABLE 7-continued r1 : ε = 1.0000
A2 = 0.0
A4 = 0.1071 × 10⁻⁶
A6 = −0.5104 × 10⁻¹⁰
A8 = 0.1937 × 10⁻¹³
A10 = 0.1149 × 10⁻¹⁶ r3 : ε = 1.00000
A2 = 0.0
A4 = −0.1704 × 10⁻⁶
A6 = −0.1056 × 10⁻⁹
A8 = −0.4616 × 10⁻¹⁵
A10 = −0.3649 × 10⁻¹⁶ r11 : ε = 1.0000
A2 = 0.0
A4 = 0.2023 × 10⁻⁷
A6 = −0.1063 × 10⁻⁹
A8 = 0.5614 × 10⁻¹³
A10 = 0.1090 × 10⁻¹⁶

TABLE 8

(7th Embodiment)

$f = 209.6$ to $185.5$ to $185.5$  $F_{H\beta=-1}/f_{\beta=-1} = 0.038$
$F_{NO} = 7.0$ to $6.4$ to $6.4$  $\Sigma d = 40.878$ to $67.979$ to $68.001$
$d_{12E}/d_{12R} = 0.98$  $F_{H2\beta=-1}/\Sigma d_{2\beta=-1} = 0.351$
$d_{23E}/d_{23R} = 1.02$

| | Radius of Curvature | | Axial Distance | | Refractive Index | | Abbe Number |
|---|---|---|---|---|---|---|---|
| r1 | −122.13 | | | | | | |
| | | d1 | 3.8 | | N1 1.5407 | v1 | 47.2 |
| r2 | −382.93 | | | | | | |
| | | d2 | 1.923 to 15.246 to 15.000 | | | | |
| r3 | 45.06 | | | | | | |
| | | d3 | 8.3 | | N2 1.7130 | v2 | 53.9 |
| r4 | 78.62 | | | | | | |
| | | d4 | 6.3 | | | | |
| r5 | −325.15(*) | | | | | | |
| | | d5 | 3.6 | | N3 1.5927 | v3 | 35.5 |
| r6 | 42.98 | | | | | | |
| | | d6 | 3.0 | | | | |
| r7 | Aperture stop | | | | | | |
| | | d7 | 0.5 | | | | |
| r8 | 65.26 | | | | | | |
| | | d8 | 4.3 | | N4 1.7725 | v4 | 49.8 |
| r9 | −122.69 | | | | | | |
| | | d9 | 4.143 to 17.920 to 18.188 | | | | |
| r10 | 193.76 | | | | | | |
| | | d10 | 5.0 | | N5 1.5168 | v5 | 64.2 |
| r11 | 91.19 | | | | | | |

Aspherical Coefficients r5 : ε = 1.0000
A2 = 0.0
A4 = −0.5503 × 10⁻⁶
A6 = 0.2594 × 10⁻⁹
A8 = −0.2873 × 10⁻¹²
A10 = 0.1597 × 10⁻²²

TABLE 9

(8th Embodiment)

$f = 209.7$ to $185.5$ to $185.5$  $F_{H\beta=-1}/f_{\beta=-1} = 0.038$
$F_{NO} = 7.0$ to $6.4$ to $6.4$  $\Sigma d = 42.359$ to $69.547$ to $69.570$
$d_{12E}/d_{12R} = 0.98$  $F_{H2\beta=-1}/\Sigma d_{2\beta=-1} = 0.359$
$d_{23E}/d_{23R} = 1.02$

| | Radius of Curvature | | Axial Distance | | Refractive Index | | Abbe Number |
|---|---|---|---|---|---|---|---|
| r1 | −129.82 | | | | | | |
| | | d1 | 3.8 | N1 | 1.5407 | v1 | 47.2 |
| r2 | −468.78 | | | | | | |
| | | d2 | 1.916 to 15.244 to 14.998 | | | | |
| r3 | 45.94(*) | | | | | | |
| | | d3 | 8.3 | N2 | 1.7130 | v2 | 53.9 |
| r4 | 96.84 | | | | | | |
| | | d4 | 6.3 | | | | |
| r5 | −2124.50 | | | | | | |
| | | d5 | 3.1 | N3 | 1.5927 | v3 | 35.5 |
| r6 | 42.19 | | | | | | |
| | | d6 | 4.7 | | | | |
| r7 | Aperture stop | | | | | | |
| | | d7 | 0.9 | | | | |
| r8 | 74.66 | | | | | | |
| | | d8 | 4.3 | N4 | 1.7725 | v4 | 49.8 |
| r9 | −152.41 | | | | | | |
| | | d9 | 4.058 to 17.917 to 18.187 | | | | |
| r10 | 183.22 | | | | | | |
| | | d10 | 5.0 | N5 | 1.5168 | v5 | 64.2 |
| r11 | 88.72 | | | | | | |

Aspherical Coefficients r3 : $\epsilon = 1.0000$
$A2 = 0.0$
$A4 = -0.2161 \cdot 10^{-6}$
$A6 = 0.1153 \times 10^{-11}$
$A8 = -0.3057 \times 10^{-12}$
$A10 = -0.2886 \times 10^{-17}$

TABLE 10

(9th Embodiment)

$f = 210$ to $185$ to $185$  $F_{H\beta=-1}/f_{\beta=-1} = 0.049$
$F_{NO} = 6.4$  $\Sigma d = 44.87$ to $70.78$ to $70.63$
$d_{12E}/d_{12R} = 0.87$  $F_{H2\beta=-1}/\Sigma d_{2\beta=-1} = 0.34$
$d_{23E}/d_{23R} = 1.16$

| | Radius of Curvature | | Axial Distance | | Refractive Index | | Abbe Number |
|---|---|---|---|---|---|---|---|
| r1 | −147.26 | | | | | | |
| | | d1 | 3.79 | N1 | 1.5168 | v1 | 64.2 |
| r2 | −1684.49 | | | | | | |
| | | d2 | 1.8 to 17.73 to 15.5 | | | | |
| r3 | 53.49 | | | | | | |
| | | d3 | 6.5 | N2 | 1.7130 | v2 | 53.9 |
| r4 | 145.04 | | | | | | |
| | | d4 | 0.5 | | | | |
| r5 | 97.00 | | | | | | |
| | | d5 | 5.0 | N3 | 1.6240 | v3 | 60.3 |
| r6 | 160.84 | | | | | | |
| | | d6 | 3.3 to 3.65 to 3.50 | | | | |
| r7 | −194.71 | | | | | | |
| | | d7 | 4.25 | N4 | 1.5927 | v4 | 35.5 |
| r8 | 44.91 | | | | | | |
| | | d8 | 6.70 to 6.35 to 6.50 | | | | |
| r9 | Aperture stop | | | | | | |

TABLE 10-continued

| | | | | | | | |
|---|---|---|---|---|---|---|---|
| | | d9 | 0 | | | | |
| r10 | 84.84 | | | | | | |
| | | d10 | 6.50 | N5 | 1.7725 | v5 | 49.8 |
| r11 | −134.57 | | | | | | |
| | | d11 | 2.94 to 12.92 to 15.0 | | | | |
| r12 | 153.06 | | | | | | |
| | | d12 | 3.59 | N6 | 1.5182 | v6 | 59.0 |
| r13 | 79.88 | | | | | | |

TABLE 11

(10th Embodiment)

$f = 210$ to $185$ to $185$  $F_{H\beta=-1}/f_{\beta=-1} = 0.043$
$F_{NO} = 6.4$  $\Sigma d = 44.5$ to $72.14$ to $72.13$
$d_{12E}/d_{12R} = 0.89$  $F_{H2\beta=-1}/\Sigma d_{2\beta=-1} = 0.35$
$d_{23E}/d_{23R} = 1.15$

| | Radius of Curvature | | Axial Distance | | Refractive Index | | Abbe Number |
|---|---|---|---|---|---|---|---|
| r1 | −137.72 | | | | | | |
| | | d1 | 3.79 | N1 | 1.5168 | v1 | 64.2 |
| r2 | −650.00 | | | | | | |
| | | d2 | 0.49 to 17.43 to 15.50 | | | | |
| r3 | 54.90 | | | | | | |
| | | d3 | 6.5 | N2 | 1.7130 | v2 | 53.9 |
| r4 | 139.34 | | | | | | |
| | | d4 | 1.8 to 2.0 to 2.0 | | | | |
| r5 | 92.39 | | | | | | |
| | | d5 | 5.0 | N3 | 1.6204 | v3 | 60.3 |
| r6 | 147.91 | | | | | | |
| | | d6 | 3.50 | | | | |
| r7 | −213.28 | | | | | | |
| | | d7 | 4.25 | N4 | 1.5927 | v4 | 35.5 |
| r8 | 45.21 | | | | | | |
| | | d8 | 6.70 to 6.50 to 6.50 | | | | |
| r9 | Aperture stop | | | | | | |
| | | d9 | 0 | | | | |
| r10 | 83.42 | | | | | | |
| | | d10 | 6.50 | N5 | 1.7725 | v5 | 49.8 |
| r11 | −137.68 | | | | | | |
| | | d11 | 2.38 to 13.08 to 15.0 | | | | |
| r12 | 168.53 | | | | | | |
| | | d12 | 3.59 | N6 | 1.5182 | v6 | 59.0 |
| r13 | 83.99 | | | | | | |

TABLE 12

(11th Embodiment)

$f = 210$ to $185$ to $185$  $F_{H\beta=-1}/f_{\beta=-1} = 0.051$
$F_{NO} = 6.4$  $\Sigma d = 44.8$ to $71.44$ to $70.63$
$d_{12E}/d_{12R} = 0.83$  $F_{H2\beta=-1}/\Sigma d_{2\beta=-1} = 0.35$
$d_{23E}/d_{23R} = 1.14$

| | Radius of Curvature | | Axial Distance | | Refractive Index | | Abbe Number |
|---|---|---|---|---|---|---|---|
| r1 | −154.63 | | | | | | |
| | | d1 | 3.79 | N1 | 1.5173 | v1 | 69.4 |
| r2 | −3587.83 | | | | | | |
| | | d2 | 1.76 to 18.58 to 15.50 | | | | |
| r3 | 53.61 | | | | | | |
| | | d3 | 6.5 | N2 | 1.7130 | v2 | 53.9 |
| r4 | 144.96 | | | | | | |

TABLE 12-continued

| | | | | | | | |
|---|---|---|---|---|---|---|---|
| | | d4 | 0.5 | | | | |
| r5 | 97.00 | | | | | | |
| | | d5 | 5.0 | N3 | 1.6228 | v3 | 56.9 |
| r6 | 160.19 | | | | | | |
| | | d6 | 3.50 | | | | |
| r7 | −183.91 | | | | | | |
| | | d7 | 4.25 | N4 | 1.5927 | v4 | 35.5 |
| r8 | 45.17 | | | | | | |
| | | d8 | 6.7 to 6.1 to 6.50 | | | | |
| r9 | Aperture stop | | | | | | |
| | | d9 | 0 | | | | |
| r10 | 84.69 | | | | | | |
| | | d10 | 6.50 | N5 | 1.7725 | v5 | 49.8 |
| r11 | −131.92 | | | | | | |
| | | d11 | 2.71 to 13.13 to 15.0 | | | | |
| r12 | 146.76 | | | | | | |
| | | d12 | 3.59 | N6 | 1.5182 | v6 | 59.0 |
| r13 | 78.09 | | | | | | |

What is claimed is:

1. A zoom lens system comprising from an original side:
   a first lens unit of negative refractive power including at least one negative lens element;
   a second lens unit of positive refractive power including at least four lens elements; and
   a third lens unit of negative refractive power including at least one negative lens element,
   wherein said second lens unit is asymmetric with respect to a center thereof, and wherein during zooming, a projection magnification is varied with a conjugate distance being maintained constant by varying a distance between the first and second lens units and a distance between the second and third lens units and by moving the entire lens system, and wherein the following conditions are fulfilled:

$$0.3 < \frac{d12E}{d12R} < 1.5$$

$$0.5 < \frac{d23E}{d23R} < 3.0$$

where d12E is a distance between the first and second lens units at an enlargement end, d12R is a distance between the first and second lens units at a reduction end, d23E is a distance between the second and third lens units at the enlargement end, and d23R is a distance between the second and third lens units at the reduction end.

2. A copying zoom lens system as claimed in claim 1, wherein the following condition is fulfilled:

$$\frac{FH2}{\Sigma d2} < 0.50$$

where FH2 is a position of a front principal point of the second lens unit at unity magnification, and $\Sigma d2$ is an axial thickness of the second lens unit at unity magnification.

3. A zoom lens system as claimed in claim 1, wherein the following condition is fulfilled:

$$-0.10 < \frac{FH\beta = -1}{f\beta = -1} < 0.20$$

where FHβ=−1 is a position of a front principal point of the entire lens system at unity magnification, and fβ=−1 is a focal length of the entire lens system at unity magnification.

4. A zoom lens system as claimed in claim 3, wherein the following condition is fulfilled:

$$-0.10 < \frac{FH\beta = -1}{f\beta = -1} < 0.10.$$

5. A zoom lens system as claimed in claim 1, wherein said second lens unit includes from the original side a first positive lens element, a second positive lens element, a negative lens element strongly concave to an image side, and a third positive lens element.

6. A zoom lens system as claimed in claim 1, wherein said second lens unit includes from the original side a first positive lens element, a negative lens element strongly concave to an image side, a second positive lens element, and a third positive lens element.

7. A zoom lens system as claimed in claim 1, wherein said second lens unit includes from the original side a first positive lens element, a first negative lens element strongly concave to an image side, a second negative lens element having a refractive power weaker than a refractive power of the first negative lens element, and a second positive lens element.

8. A zoom lens system comprising from an original side:
   a first lens unit of negative refractive power including at least one negative lens element;
   a second lens unit of positive refractive power including at least three lens elements; and
   a third lens unit of negative refractive power including at least one negative lens element,
   wherein said second lens unit is asymmetric with respect to a center thereof, and wherein at least one aspherical surface is provided in the entire lens system, and wherein during zooming, a projection magnification is varied with a conjugate distance being maintained constant by varying a distance between the first and second lens units and a distance between the second and third lens units and by moving the entire lens system, and wherein the following conditions are fulfilled:

$$0.3 < \frac{d12E}{d12R} < 1.5$$

$$0.5 < \frac{d23E}{d23R} < 2.0$$

where d12E is a distance between the first and second lens units at an enlargement end, d12R is a distance between the first and second lens units at a reduction end, d23E is a distance between the second and third lens units at the enlargement end, and d23R is a distance between the second and third lens units at the reduction end.

9. A zoom lens system as claimed in claim 8, wherein the following condition is fulfilled:

$$\frac{FH2}{\Sigma d2} < 0.50$$

where FH2 is a position of a front principal point of the second lens unit at unity magnification, and $\Sigma d2$ is an axial thickness of the second lens unit at unity magnification.

10. A zoom lens system as claimed in claim 8, wherein the following condition is fulfilled:

$$-0.10 < \frac{FH\beta = -1}{f\beta = -1} < 0.20$$

where FHβ=−1 is a position of a front principal point of the entire lens system at unity magnification, and fβ=−1 is a focal length of the entire lens system at unity magnification.

11. A zoom lens system as claimed in claim 10, wherein the following condition is fulfilled:

$$-0.10 < \frac{FH\beta = -1}{f\beta = -1} < 0.10.$$

12. A zoom lens system as claimed in claim 8, wherein the first and third lens units move substantially symmetrically with respect to the second lens unit during enlargement and during reduction.

13. A zoom lens system as claimed in claim 12, wherein said second lens unit includes four lens elements.

14. A zoom lens system as claimed in claim 13, wherein said first and third lens units each include an aspherical surface.

15. A zoom lens system as claimed in claim 12, wherein said second lens unit includes three lens elements.

16. A zoom lens system as claimed in claim 15, wherein said second lens unit includes an aspherical surface.

17. A zoom lens system as claimed in claim 8, wherein during enlargement, the distance between the first and second lens units decreases and the distance between the second and third lens units increases, and during reduction, the distance between the first and second lens units increases and the distance between the second and third lens units increases.

18. A zoom lens system as claimed in claim 17, wherein said first, second and third lens units each include an aspherical surface.

19. A zoom lens system comprising from an original side:
a first lens unit of negative refractive power including at least one negative lens element;
a second lens unit of positive refractive power including at least four lens elements; and
a third lens unit of negative refractive power including at least one negative lens element,
wherein said second lens unit is asymmetric with respect to a center thereof, and wherein during zooming, a projection magnification is varied with a conjugate distance being maintained constant by varying a distance between the first and second lens units and a distance between the second and third lens units and by moving the entire lens system, and wherein the following condition is fulfilled:

$$0.01 < \left| \frac{\Delta dn}{dn} \right| < 1.5$$

where $\Delta dn$ is a difference in axial distances between lens elements which move in the second lens unit which vary during zooming between at unity magnification and at a magnification other than unity, and dn is an axial distance at unity magnification between lens elements which move during zooming in the second lens unit.

20. A zoom lens system as claimed in claim 19, wherein the following condition is fulfilled:

$$\frac{FH2}{\Sigma d2} < 0.50$$

where FH2 is a position of a front principal point of the second lens unit at unity magnification, and $\Sigma d2$ is an axial thickness of the second lens unit at unity magnification.

21. A zoom lens system as claimed in claim 19, wherein the following condition is fulfilled:

$$-0.10 < \frac{FH\beta = -1}{f\beta = -1} < 0.20$$

where $FH\beta=-1$ is a position of a front principal point of the entire lens system at unity magnification, and $f\beta=-1$ is a focal length of the entire lens system at unity magnification.

22. A zoom lens system as claimed in claim 21, wherein the following condition is fulfilled:

$$-0.10 < \frac{FH\beta = -1}{f\beta = -1} < 0.10.$$

23. A zoom lens system as claimed in claim 19, wherein the following conditions are fulfilled:

$$0.3 < \frac{d12E}{d12R} < 1.5$$

$$0.5 < \frac{d23E}{d23R} < 3.0$$

where d12E is a distance between the first and second lens units at an enlargement end, d12R is a distance between the first and second lens units at a reduction end, d23E is a distance between the second and third lens units at the enlargement end, and d23R is a distance between the second and third lens units at the reduction end.

24. A zoom lens system comprising from an original side:
a first lens unit of negative refractive power including a negative meniscus lens element concave to the original side;
a second lens unit of positive refractive power including four lens elements; and
a third lens unit including a negative meniscus lens element convex to the original side,
wherein said second lens unit is asymmetric with respect to a center thereof, and wherein at least one aspherical surface is provided in the entire lens element system, and wherein during zooming, a projection magnification is varied with a conjugate distance being maintained constant by varying a distance between the first and second lens units and a distance between the second and third lens units and by moving the entire lens system, and wherein the following conditions are fulfilled:

$$0.3 < \frac{d12E}{d12R} < 1.5$$

$$0.5 < \frac{d23E}{d23R} < 3.0$$

where d12E is a distance between the first and second lens units at an enlargement end, d12R is a distance between the first and second lens units at a reduction end, d23E is a distance between the second and third lens units at the enlargement end, and d23R is a distance between the second and third lens units at the reduction end.

25. A zoom lens system as claimed in claim 24, wherein the following conditions are fulfilled:

$$\frac{FH2}{\Sigma d2} < 0.50$$

$$-0.10 < \frac{FH\beta = -1}{f\beta = -1} < 0.10$$

where FH2 is a position of a front principal point of the second lens unit at unity magnification, $\Sigma d2$ is an axial thickness of the second lens unit at unity magnification, $FH\beta=-1$ is a position of a front principal point of the entire lens system at unity magnification, and $f\beta=-1$ is a focal length of the entire lens system at unity magnification.

26. A zoom lens system comprising from an original side:
   a first lens unit of negative refractive power including a negative meniscus lens element concave to the original side;
   a second lens unit of positive refractive power including two positive meniscus lens elements convex to the original side, a bi-concave lens element strongly concave to an image side, and a bi-convex lens element; and
   a third lens element of negative refractive power including a negative meniscus lens element convex to the original side,
   wherein said second lens unit is asymmetric with respect to a center of the lens units of the lens system, and wherein during zooming, a projection magnification is varied with a conjugate distance being maintained constant by varying a distance between the first and second lens units and a distance between the second and third lens units and by moving the entire lens system, and wherein at least one of the lens elements of the second lens unit is moved relative to the other lens elements in the second lens unit during zooming, and wherein the following condition is fulfilled:

$$0.01 < \left| \frac{\Delta dn}{dn} \right| < 1.5$$

where $\Delta dn$ is a difference in distance between the moved lens element of the second lens unit and a lens element adjacent to the moved lens element at a magnification other than unity and at unity magnification, and dn is a distance between the moved lens element and the lens element adjacent to the moved lens element at unity magnification.

27. A zoom lens system as claimed in claim 26, wherein during zooming, the bi-concave lens element is moved relative to the other lens elements of the second lens unit.

28. A zoom lens system as claimed in claim 26, wherein during zooming, the image side positive meniscus lens element and the bi-concave lens element are integrally moved relative to the other lens elements of the second lens unit.

29. A zoom lens system as claimed in claim 26, wherein during zooming, the bi-convex lens element is moved relative to the other leds elements of the second lens unit.

30. A zoom lens system as claimed in claim 26, wherein the following conditions are fulfilled:

$$0.3 < \frac{d12E}{d12R} < 1.5$$

$$0.5 < \frac{d23E}{d23R} < 3.0$$

$$\frac{FH2}{\Sigma d2} < 0.50$$

$$-0.10 < \frac{FH\beta=-1}{f\beta=-1} < 0.10$$

where d12E is a distance between the first and second lens units at an enlargement end, d12R is a distance between the first and second lens units at a reduction end, d23E is a distance between the second and third lens units at the enlargement end, d23R is a distance between the second and third lens units at the reduction end, FH2 is a position of a front principal point of the second lens unit at unity magnification, $\Sigma d2$ is an axial thickness of the second lens unit at unity magnification, $FH\beta=-1$ is a position of a front principal point of the entire lens system at unity magnification, and $f\beta=-1$ is a focal length of the entire lens system at unity magnification.

* * * * *